(12) United States Patent
Kamioka

(10) Patent No.: US 8,474,582 B2
(45) Date of Patent: Jul. 2, 2013

(54) CUSHION DEVICE AND MOTORCYCLE

(75) Inventor: Takamasa Kamioka, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 117 days.

(21) Appl. No.: 12/859,849

(22) Filed: Aug. 20, 2010

(65) Prior Publication Data

US 2011/0057370 A1 Mar. 10, 2011

(30) Foreign Application Priority Data

Sep. 8, 2009 (JP) ................... 2009-206713

(51) Int. Cl.
*F16F 9/00* (2006.01)
*F16F 5/00* (2006.01)

(52) U.S. Cl.
USPC ........... 188/314; 188/315; 188/316; 188/318; 188/319.1; 188/319.2; 188/322.13; 188/322.17; 188/322.21; 267/177; 267/64.16; 267/64.17; 267/64.26; 267/175

(58) Field of Classification Search
USPC ................... 188/314, 316, 318, 319.1, 319.2, 188/322.13, 322.17, 322.21, 315; 267/DIG. 2, 267/64.16, 64.17, 64.26, 175, 177
See application file for complete search history.

(56) References Cited

U.S. PATENT DOCUMENTS

| | | | | |
|---|---|---|---|---|
| 3,998,302 A | * | 12/1976 | Schupner | 188/285 |
| 4,061,320 A | * | 12/1977 | Warner | 267/64.15 |
| 4,275,900 A | * | 6/1981 | Andreoli et al. | 280/283 |
| 4,863,002 A | * | 9/1989 | Kimberlin | 188/318 |
| 5,400,880 A | * | 3/1995 | Ryan | 188/314 |
| 5,647,580 A | * | 7/1997 | Buma | 267/64.17 |
| 7,441,638 B2 | * | 10/2008 | Hanawa | 188/314 |
| 2008/0018028 A1 | | 1/2008 | Kamioka | |

FOREIGN PATENT DOCUMENTS

| | | | |
|---|---|---|---|
| EP | 2 048 074 A2 | | 4/2009 |
| JP | 62-108094 U | | 7/1987 |
| JP | 01131343 A | * | 5/1989 |
| JP | 05-038434 U | | 5/1993 |
| JP | 06-143956 A | | 5/1994 |
| JP | 07-167195 A | | 7/1995 |
| JP | 2685183 B2 | | 12/1997 |
| JP | 10-281208 A | | 10/1998 |
| JP | 2002-227906 A | | 8/2002 |
| JP | 2007-309434 A | | 11/2007 |
| JP | 2008-025679 A | | 2/2008 |
| JP | 2009-024871 A | | 2/2009 |
| JP | 2009-041690 A | | 2/2009 |
| JP | 2009-090889 A | | 4/2009 |

OTHER PUBLICATIONS

English language translation of Abstract for JP 62-108094 U.

* cited by examiner

*Primary Examiner* — Bradley King
*Assistant Examiner* — Mahbubur Rashid
(74) *Attorney, Agent, or Firm* — Keating & Bennett, LLP

(57) ABSTRACT

A cushion device includes a shock absorber and an accumulator. As a piston moves in a certain direction in a cylinder so that the shock absorber is compressed, oil in an oil chamber is discharged to the accumulator through an oil hose. The compression operation of the piston allows a slide member to slide and the capacity of an oil chamber is reduced. The oil in the oil chamber is discharged to a regulation unit through an oil hose. The regulation unit controls a valve by the pressure of the oil coming in from the oil chamber and applies resistance to the oil discharged from an oil chamber to an oil chamber.

14 Claims, 15 Drawing Sheets

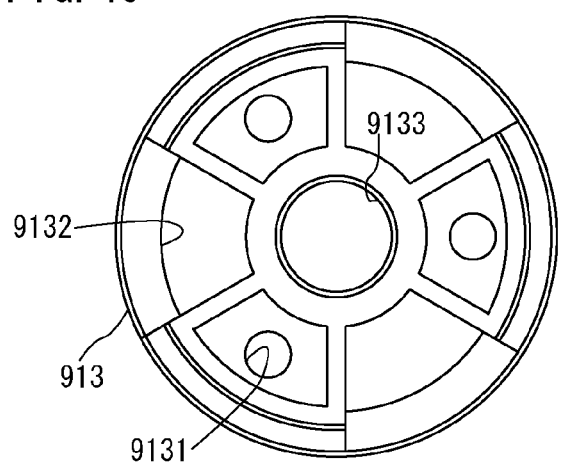

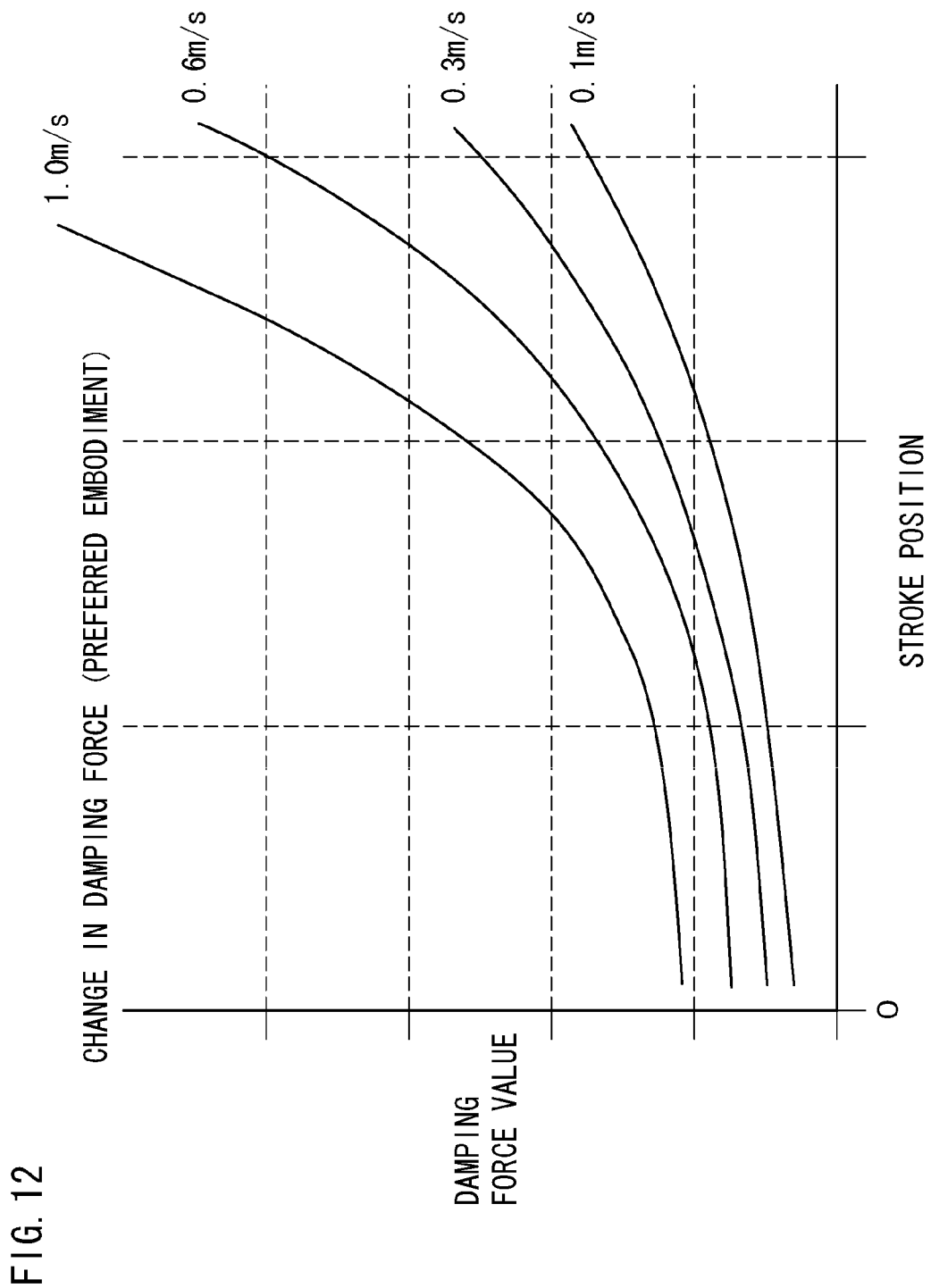

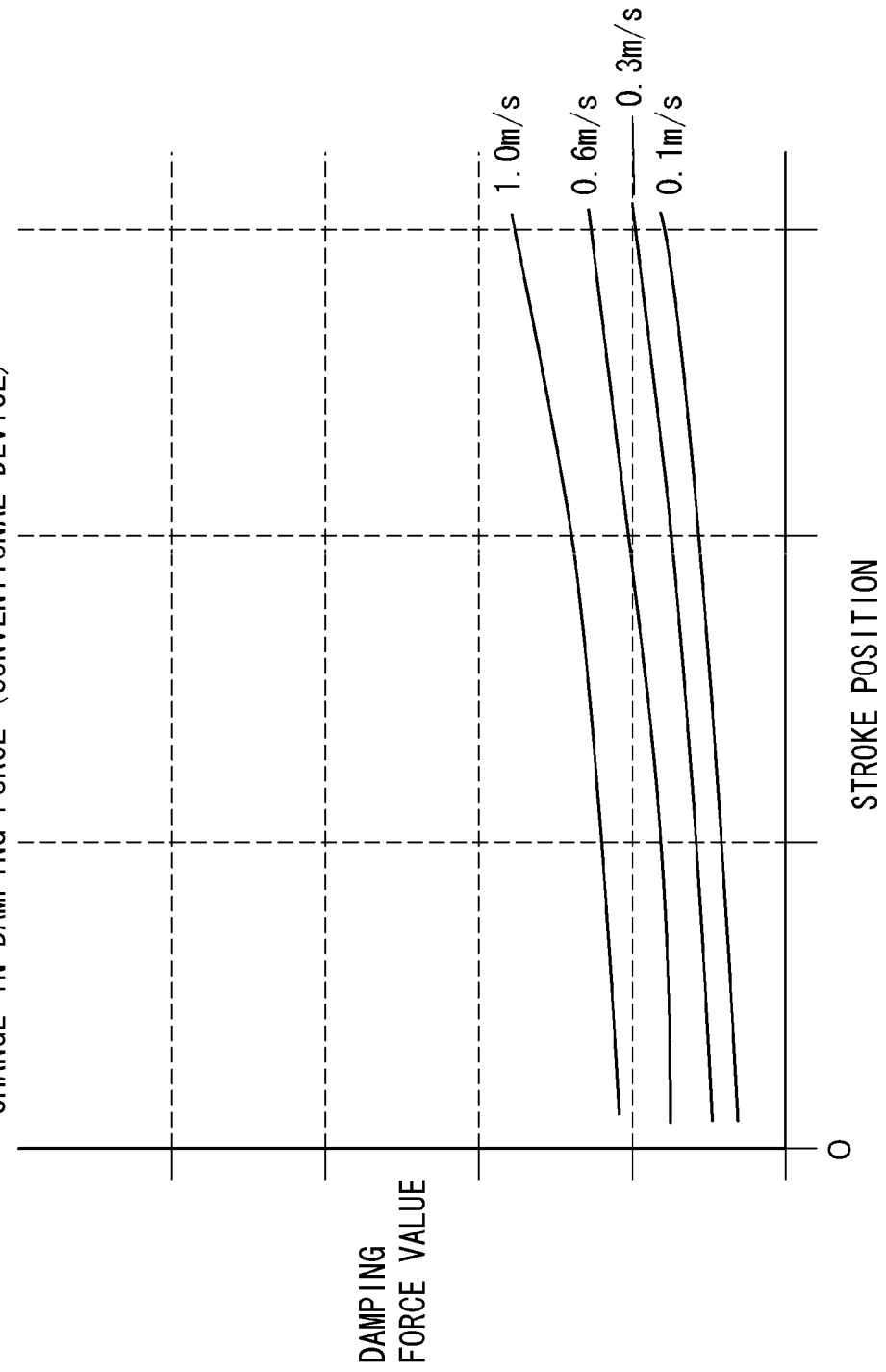
FIG. 13 CHANGE IN DAMPING FORCE (CONVENTIONAL DEVICE)

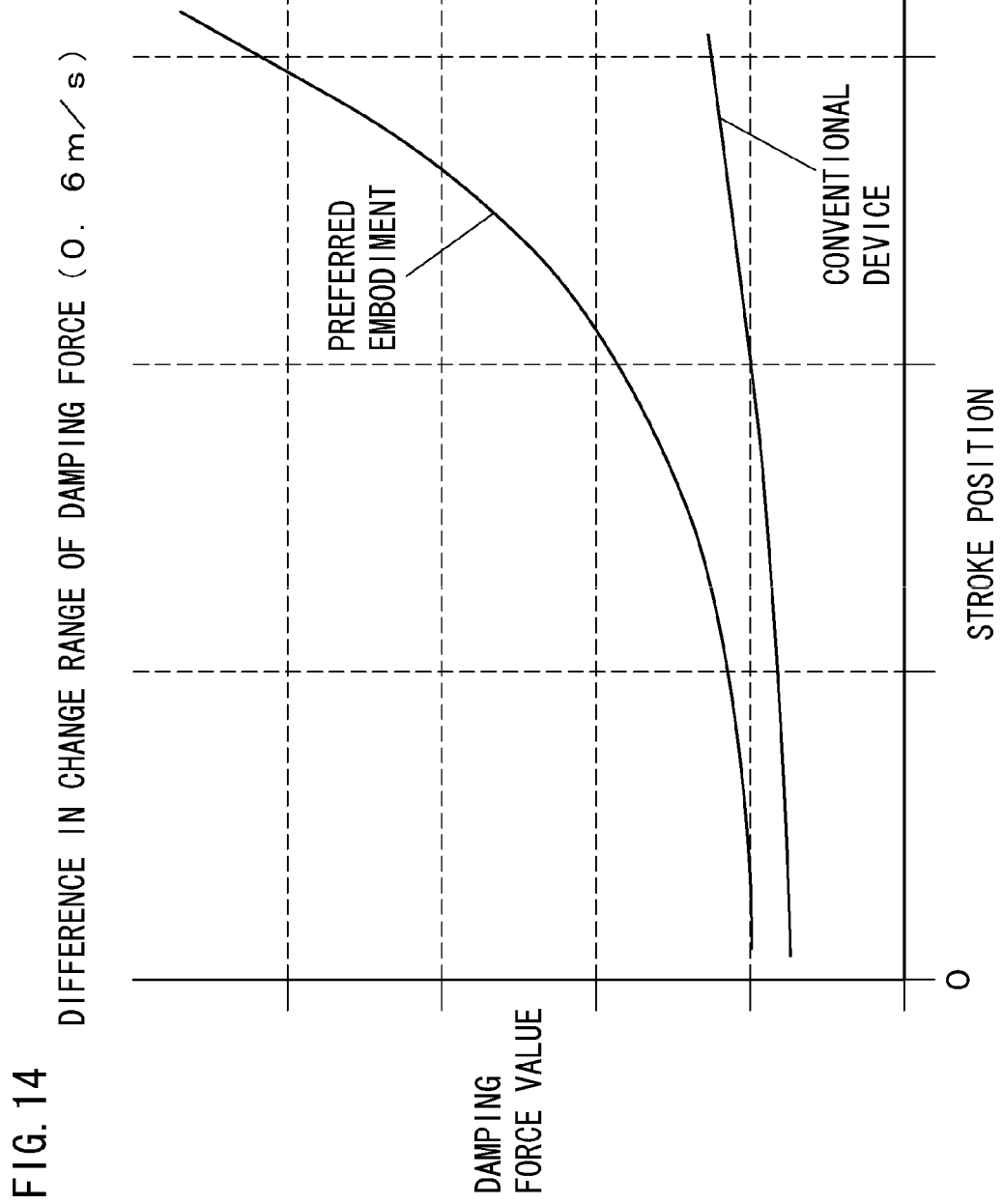

CUSHION DEVICE AND MOTORCYCLE

BACKGROUND OF THE INVENTION

1. Field of the Invention

The present invention relates to a cushion device used for a suspension in a vehicle. The present invention more specifically relates to a cushion device that generates a damping force according to the displacement of a piston.

2. Description of the Background Art

A vehicle such as a motorcycle is provided with a suspension. The suspension supports the front or rear wheel of the motorcycle. By the function of the suspension, force applied on the front or rear wheel is absorbed and impact applied on the vehicle is alleviated.

The suspension includes an arm that supports the wheel and a cushion device that supports the arm. The cushion device includes a combination of a spring and a shock absorber. Alternatively, an air spring is used instead of a metal spring.

The shock absorber includes a piston and a cylinder. As the piston moves in the cylinder against the spring force, the shock absorber is compressed. When the piston moves in the cylinder, the movement of the piston is supplied with resistance by oil in the cylinder.

In the disclosure of JP 5-38434 U, a shock absorber generates a damping force depending on the position of a piston. The shock absorber includes an accumulator that accumulates oil outside the shock absorber. Oil discharged to the accumulator from the shock absorber is provided with resistance when it passes through a damping force generator.

More specifically, pressure is applied on a spring provided at the outer circumference of the shock absorber as the piston moves. When the pressure upon the spring increases and the support portion of the spring is displaced, the displacement is transmitted to a valve through a cushion member. As the displacement of the piston increases, the displacement of the cushion member increases and greater resistance is applied on oil passed through the valve.

In this way, the shock absorber disclosed by JP 5-38434 U generates a damping force depending on the position of the piston. However, the valve is controlled based on the displacement of the cushion member, and therefore the range of the damping force to be generated is not wide.

SUMMARY OF THE INVENTION

A cushion device according to a preferred embodiment of the present invention includes a shock absorber including a first member including a cylinder and a second member including a piston and an accumulator arranged to accumulate oil discharged from the shock absorber, and a relative position of the second member to the first member is variable. The shock absorber includes a first oil chamber whose capacity changes depending on the relative position of the second member and a first fluid chamber whose capacity changes depending on the relative position of the second member. The cushion device further includes an oil path connected to the first oil chamber and a fluid path connected to the first fluid chamber. The accumulator includes a second oil chamber connected to the first oil chamber through the oil path, a second fluid chamber connected to the first fluid chamber through the fluid path, and a valve controlled by the pressure of fluid supplied to the second fluid chamber through the fluid path. The valve applies resistance to the flow of oil discharged from the first oil chamber depending on the relative position of the second member.

The valve is controlled based on pressure changes in the fluid chamber, and therefore a damping force in a wide range can be generated corresponding to changes in the relative position of the piston.

According to another preferred embodiment of the invention, the oil path includes a first oil path arranged to supply the second oil chamber with oil in the first oil chamber during the compression operation of the shock absorber. The valve includes a first valve arranged to apply resistance to oil discharged into the second oil chamber through the first oil path during the compression of the shock absorber.

During the compression operation of the piston, the damping force can be generated in a wide range.

According to yet another preferred embodiment of the invention, the oil path includes a second oil path arranged to supply the second oil chamber with oil in the first oil chamber during the expansion of the shock absorber. The valve includes a second valve that applies resistance to oil discharged from the first oil chamber through the second oil path during the expansion of the shock absorber.

A damping force can be generated in a wide range during the expansion operation of the piston.

Various preferred embodiments of the present invention address the above-described problems associated with the background art and provide a cushion device that is capable of generating a damping force in a wide range.

The above and other features, elements, steps, characteristics and advantages of the present invention will become more apparent from the following detailed description of the preferred embodiments of the present invention with reference to the attached drawings.

BRIEF DESCRIPTION OF THE DRAWINGS

FIG. 4C is a bottom view of the valve main body.
FIG. 12 is a graph showing a damping force by a shock absorber according to the first preferred embodiment of the present invention.
FIG. 13 is a graph showing a damping force by a conventional shock absorber.
FIG. 14 is a graph showing in comparison a damping force by the shock absorber according to the first preferred embodiment of the present invention and a damping force by a conventional shock absorber.

DETAILED DESCRIPTION OF THE PREFERRED EMBODIMENTS

Figure 1:
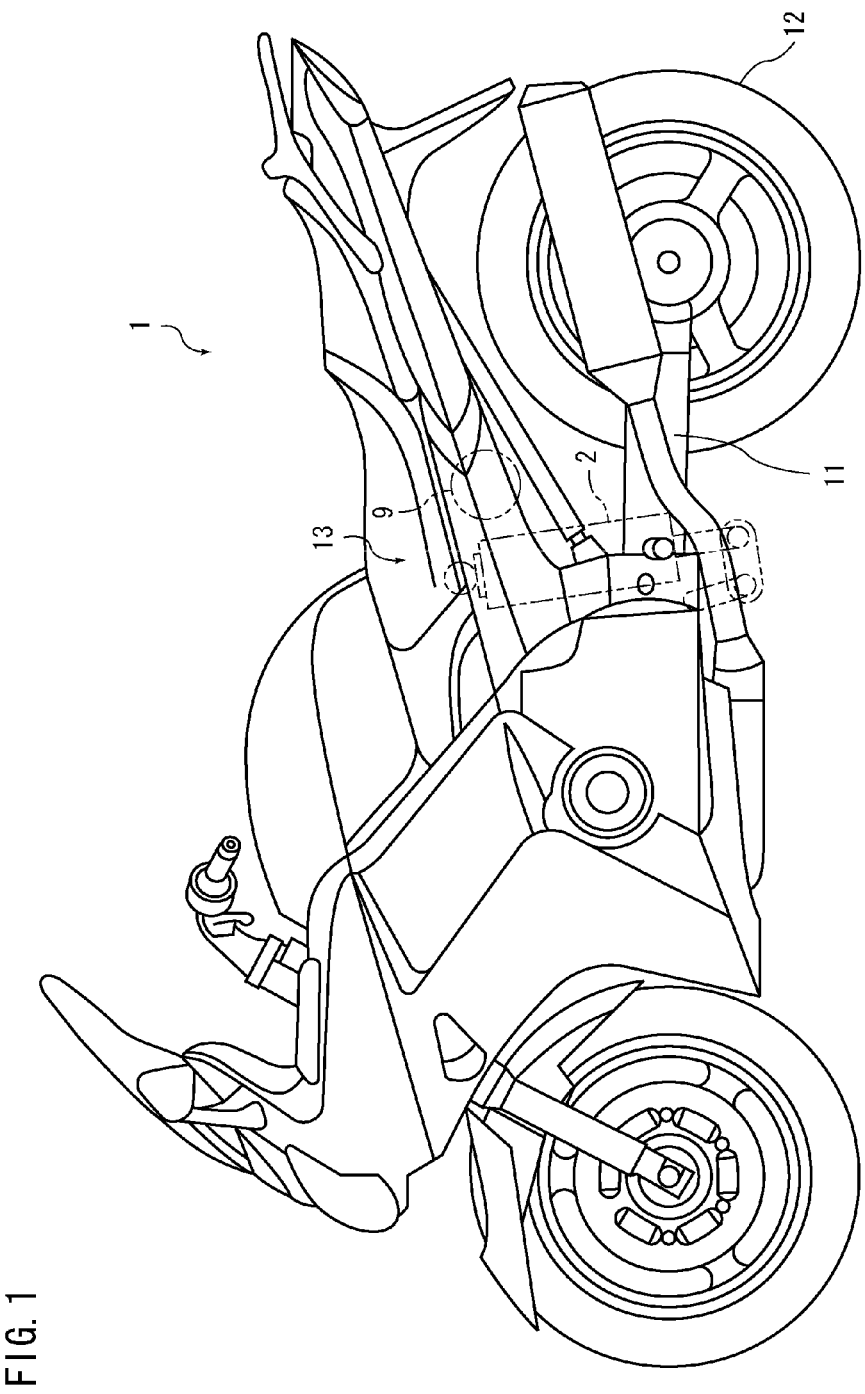
FIG. 1 is a side view of a motorcycle.

Now, preferred embodiments of the present invention will be described in conjunction with the accompanying drawings. FIG. 1 is a side view of a motorcycle 1 according to the present preferred embodiment. A vehicle body frame (not shown) in the motorcycle 1 is provided with a rear arm 11 in a vertically rotatable manner. A rear wheel 12 is rotatably supported at the rear end of the rear arm 11.

A cushion device 13 is provided in front of the rear wheel 12. The cushion device 13 includes a shock absorber 2 and an accumulator 9. The shock absorber 2 is arranged to be slightly inclined toward the front. The accumulator 9 is provided substantially parallel to the horizontal direction. The rear arm 11 and the cushion device 13 constitute a rear suspension used to support the rear wheel 12.

Now, first to fifth preferred embodiments of the present invention will be described. In the preferred embodiments, the shock absorber 2 shown in FIG. 1 will be replaced by shock absorbers 2A to 2E. In the preferred embodiments, the accumulator 9 shown in FIG. 1 is replaced by an accumulator 9A or 9B.

First Preferred Embodiment

Figure 2:
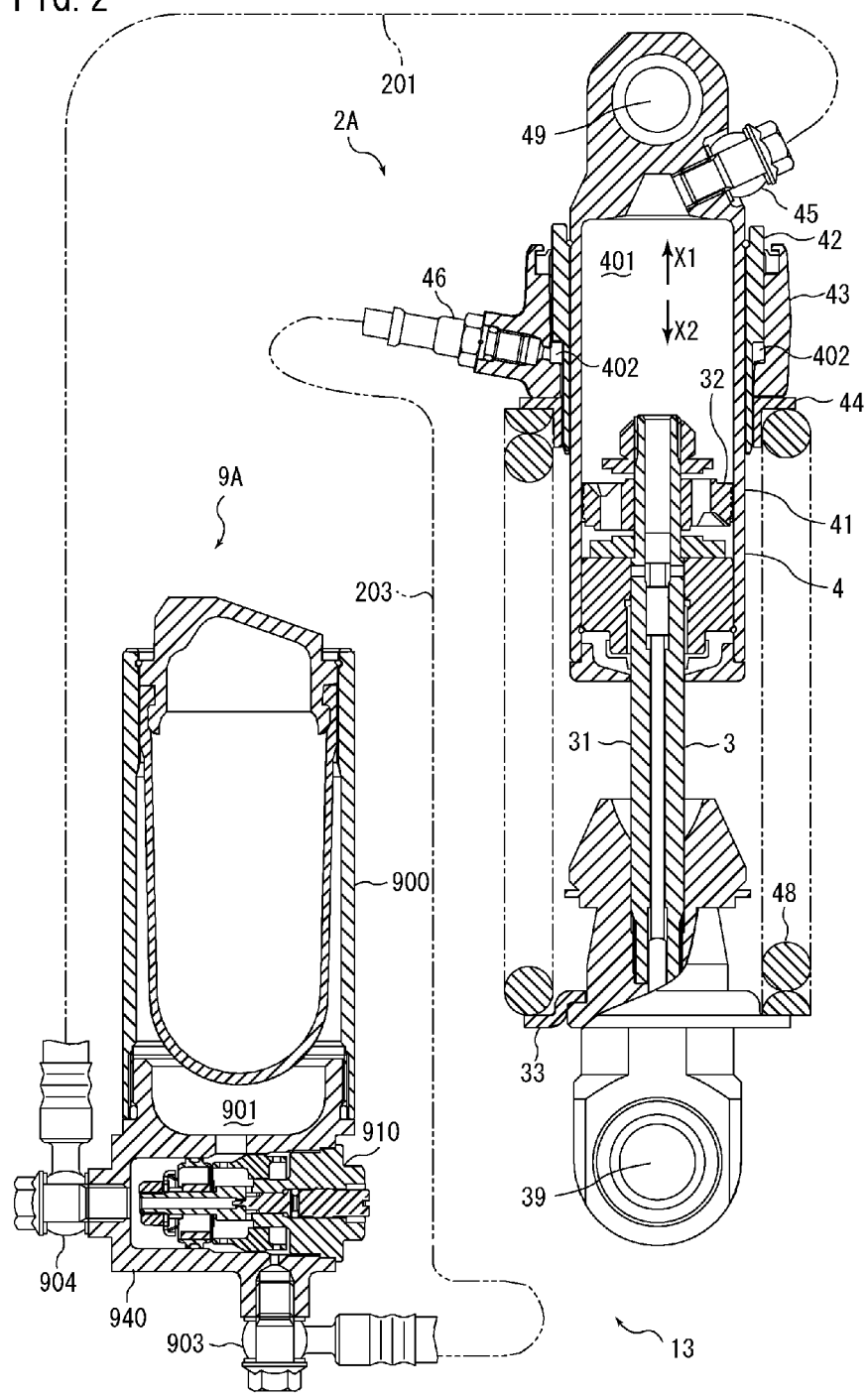
FIG. 2 is a sectional view of a cushion device according to a first preferred embodiment of the present invention.

FIG. 2 is a sectional view of the cushion device 13 according to the first preferred embodiment. The cushion device 13 according to the first preferred embodiment includes a shock absorber 2A and an accumulator 9A.

The shock absorber 2A includes a first member 4 including a cylinder 41 and a second member 3 including a piston 32. The shock absorber 2A is compressed/expanded as the relative position between the first member 4 and the second member 3 changes.

An oil chamber 401 is provided in the cylinder 41 of the first member 4. The piston 32 of the second member 3 is inserted in the cylinder 41.

The second member 3 includes a piston rod 31 and a piston 32 attached at the tip end of the piston rod 31. A coupling portion 39 is provided at one end of the second member 3. The coupling portion 39 is coupled to the rear arm 11 through a link mechanism that is not shown. The coupling portion 39 may be coupled directly to the rear arm 11.

An annular support member 42 is attached at the outer circumference of the cylinder 41 of the first member 4. An annular slide member 43 is attached at the outer circumference of the support member 42. The slide member 43 is attached so that it can slide on the support member 42 in the axial direction of the cylinder 41 (in the direction of the arrow X1 or X2 in FIG. 2).

A spring support member 44 is attached at one end of the slide member 43. A spring support member 33 is attached to the piston rod 31. A spring 48 is attached between the spring support members 44 and 33. When the piston 32 moves axially in the cylinder 41, the spring 48 is compressed/expanded to apply resistance to the movement of the second member 3.

The oil chamber 401 includes a port 45. The port 45 is connected with an oil hose 201. The oil in the oil chamber 401 is discharged into the accumulator 9A or the oil in the accumulator 9A flows in the oil chamber 401 through the port 45 and the oil hose 201. A coupling portion 49 is provided at an end of the first member 4. The coupling portion 49 is attached to a frame in the motorcycle 1 that is not shown. The first member 4 is attached to a frame in the motorcycle 1 at the coupling portion 49 so that it can rotate in the vertical direction.

A ring-shaped oil chamber 402 is disposed between the support member 42 and the slide member 43. When the slide member 43 moves relative to the support member 42, the capacity of the oil chamber 402 changes.

The oil chamber 402 is coupled with a port 46. The port 46 is connected with an oil hose 203. The oil in the oil chamber 402 is discharged into the accumulator 9A or the oil in the accumulator 9A flows in the oil chamber 402 through the port 46 and the oil hose 203.

The accumulator 9A includes a tank 900. An oil chamber 901 is provided in the tank 900. A casing 940 is attached to one end of the tank 900. The casing 940 includes a regulation unit 910. The regulation unit 910 serves to apply resistance to oil coming in from the shock absorber 2A and apply a damping force on the compression operation of the shock absorber 2A.

The regulation unit 910 is coupled with ports 903 and 904. The port 903 is connected with the oil hose 203. The port 904 is connected with the oil hose 201. The oil in the oil chamber 401 of the cylinder 41 flows in the regulation unit 910 through the oil hose 201 and the port 904. The oil in the oil chamber 402 flows in the regulation unit 910 through the oil hose 203 and the port 903.

Figure 3:
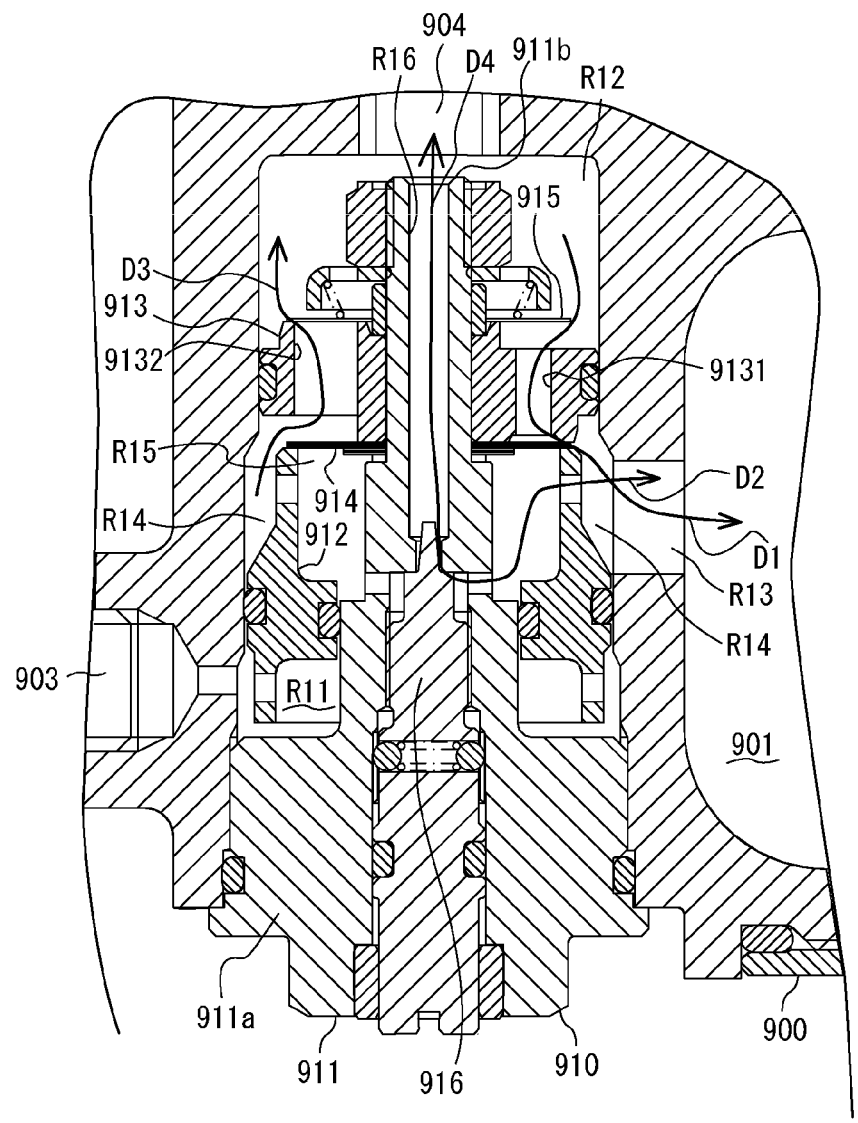
FIG. 3 is a sectional view of a regulation unit.

FIG. 3 is a sectional view of the regulation unit 910. The regulation unit 910 has its up-down direction changed depending on the arrangement of the accumulator 9A and therefore it does not have any fixed up-down direction. In the following description, the vertical direction in FIG. 3 will be referred to as the up-down direction of the regulation unit 910 for ease of illustration.

The regulation unit 910 includes a unit main body 911. The unit main body 911 includes a support portion 911a having a large diameter and an extension portion 911b having a smaller diameter and extended upward.

The shaft center of the support portion 911a is hollow and a needle 916 is inserted in the hollow space. The shaft center of the extension portion 911b is hollow and defines an oil path R16. The upper end of the needle 916 is inserted in the lower end of the oil path R16, so that an orifice is provided.

An annular slide member 912 is fitted at the outer circumference of the extension portion 911b. The slide member 912 is positioned above the support member 911a, and an oil path R11 is provided between the support portion 911a and the slide member 912. The oil path R11 is communicated with the port 903. The oil path R11 is communicated with the oil chamber 402 through the port 903, the oil hose 203, and the port 46. The slide member 912 is movable in the axial direction of the extension portion 911b.

Figure 4A:
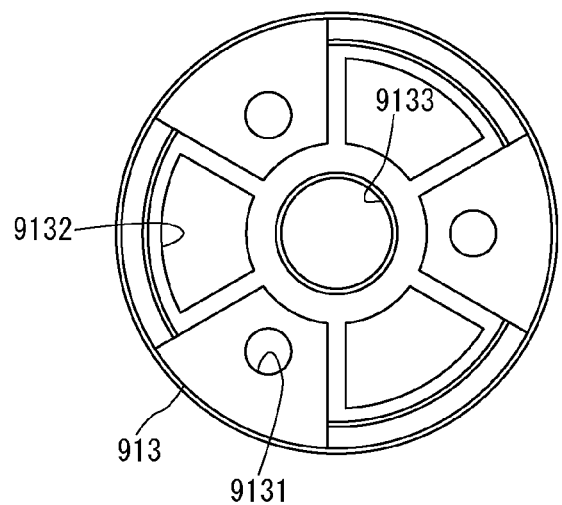
FIG. 4A is a plan view of a valve main body.
Figure 4B:
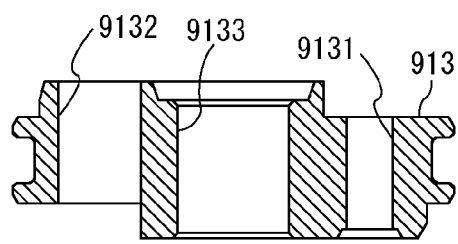
FIG. 4B is a side sectional view of the valve main body.

A valve main body 913 is attached at the outer circumference of the extension portion 911b above the slide member 912. FIGS. 4A, 4B, and 4C are a plan view, a side sectional view, and a bottom view of the valve main body 913, respectively.

The valve main body 913 includes a port 9131 having a small opening space when seen in a plan view and a port 9132 having a large opening space when seen in a plan view. The shaft center of the valve main body 913 has a hole 9133, into which the extension portion 911b is inserted.

Referring back to FIG. 3, an oil path R12 is disposed above the valve main body 913. The oil path R12 is communicated with the port 904. An annular plate spring 914 is attached on the lower side of the valve main body 913. An oil path R15 is disposed in a region surrounded by the outer circumferential surface of the extension portion 911b, the inner circumferential surface of the slide member 912 and the lower surface of the plate spring 914. The oil path R14 is disposed at the outer circumference of the slide member 912. The oil paths R14 and R15 are communicated through a port located at the slide member 912.

The port 9131, the slide member 912, and the plate spring 914 constitute a valve that applies resistance to the flow of oil discharged into the oil path R14 from the port 9131.

The upper end of the slide member 912 is in contact with the lower portion of the plate spring 914. As the oil pressure in the oil path R11 changes, the slide member 912 moves up and down or the contact pressure of the slide member 912 upon the plate spring 914 changes. The upward pressure upon the plate spring 914 changes as the slide member 912 moves up and down or the contact pressure upon the plate spring 914 changes. In this way, the oil discharged from the port 9131 to the oil path R14 is provided with resistance. The resistance serves as a damping force during the compression operation of the shock absorber 2A as will be described.

An annular valve member 915 is attached on the upper side of the valve main body 913. The port 9132 and the valve member 915 constitute a check valve used to control the flow of oil in the direction from the port 9132 to the oil path R12.

The operation of the cushion device 13 having the above-described structure will be described. To start with, the compression operation of the shock absorber 2A will be described. Referring to FIG. 2, the wheel 12 and the rear arm 11 move upward relative to the vehicle while the motorcycle 1 travels. The relative distance between the second member 3 and the first member 4 is reduced according to the movement, so that the piston 32 moves in the cylinder 41 in the direction of the arrow X1 in FIG. 2.

The oil in the oil chamber 401 passes the orifice at the inner circumferential surface of the piston rod 31 and escapes to the back side (in the direction of the arrow X2) of the piston 32 as the piston 32 moves in the direction of the arrow X1. As the piston 32 moves in the direction of the arrow X1, the oil in the oil chamber 401 escapes to the back side of the piston 32 through a port provided at the piston 32.

As the piston 32 moves in the direction of the arrow X1, the piston 31 enters the cylinder 41. In this way, the capacity in the oil chamber 401 is reduced. The oil in the oil chamber 401 is discharged from the port 45 by the amount corresponding to the increase in the volume caused by the entering of the piston rod 31. The oil discharged from the port 45 comes into the regulation unit 910 from the port 904 through the oil hose 201.

As the relative distance between the second member 3 and the first member 4 is reduced, the spring 48 is compressed. As the spring 48 is compressed, the spring support member 44 is subjected to pressure in the direction of the arrow X1. As the spring support member 44 is subjected to pressure in the direction of the arrow X1, the slide member 43 slides in the direction of the arrow X1. In this way, the capacity of the oil chamber 402 is reduced.

As the capacity of the oil chamber 402 is reduced, the oil in the oil chamber 402 is discharged from the port 46. The oil discharged from the port 46 comes into the regulation unit 910 from the port 903 through the oil hose 203.

Referring to FIG. 3, the oil discharged from the oil chamber 401 comes into the oil path R12 from the port 904. The oil coming into the oil path R12 is discharged into the oil path R14 through the port 9131.

Figure 5:
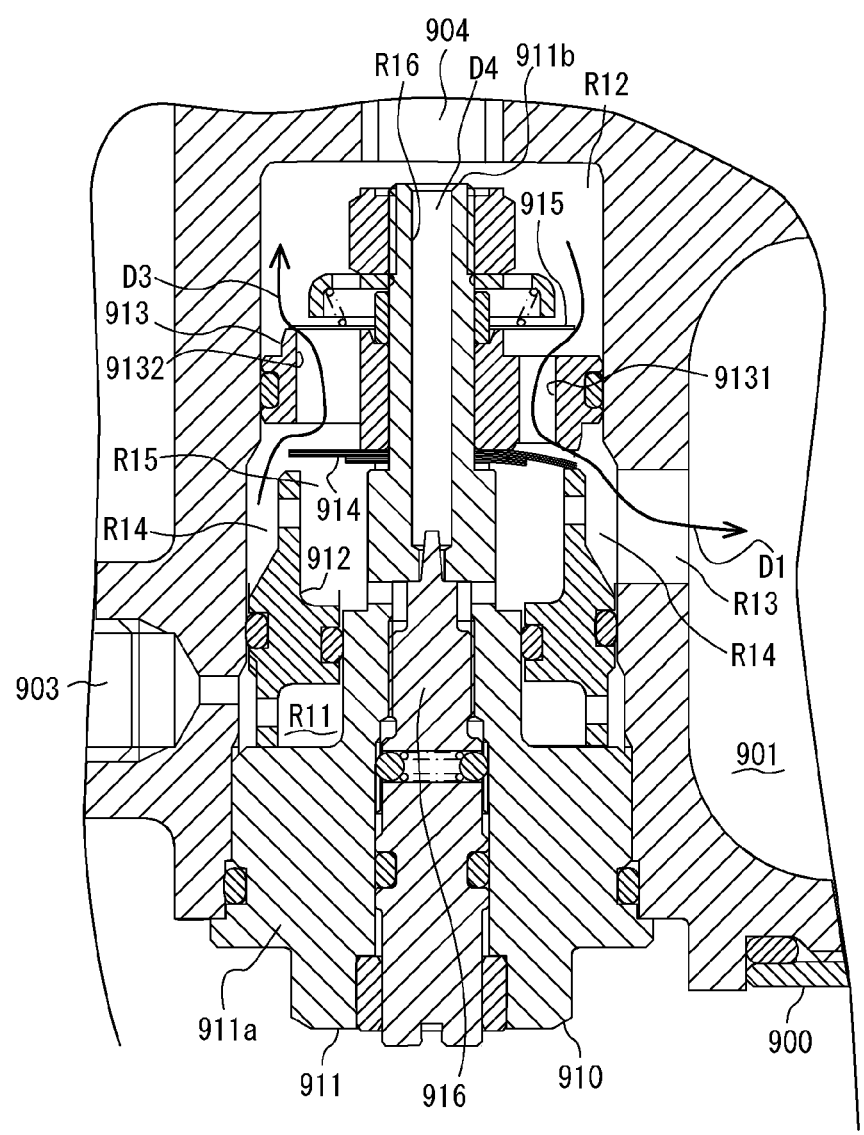
FIG. 5 is a sectional view of the regulation unit.

The oil discharged from the oil chamber 402 comes into the oil path R11 from the port 903. The slide member 912 moves upward in the FIG. 3 or the contact pressure upon the plate spring 914 is raised by the oil discharged into the oil path R11, so that upward pressure is applied upon the plate spring 914. In this way, resistance is applied to the oil discharged into the oil path R14 from the port 9131 by the valve including the plate spring 914. As the length of the piston 32 entering the cylinder increases and the oil pressure in the oil chamber 401 increases, the oil directed to the oil path R14 from the port 9131 is discharged into the oil path R14 while pressing the plate spring 914 in the downward direction shown in FIG. 5.

The pressure that raises the plate spring 914 in the upward direction applies resistance to the oil discharged to the oil path R14 from the port 9131. The pressure is generated based on the upward displacement of the slide member 912 or the contact pressure upon the plate spring 914. The slide member 912 is displaced in the up-down direction based on the pressure of oil in the oil chamber R11 or changes the contact pressure upon the plate spring 914. The pressure of oil in the oil chamber R11 changes based on the pressure of oil in the oil chamber 402 shown in FIG. 2. The pressure of oil in the oil chamber 402 changes according to the displacement amount of the second member 3 including the piston 32. More specifically, the resistance applied to the oil discharged to the oil path R14 from the port 9131 changes depending on the pressure of oil in the oil chamber 402.

As shown in FIG. 3, the oil discharged from the port 9131 to the oil path R14 flows in the direction of the arrow D1 and comes into the oil chamber 901. In this way, during the compression operation of the shock absorber 2A, the oil in the oil chamber 401 comes into the oil chamber 901 along the arrow D1. During the compression operation of the shock absorber 2A, the oil in the oil chamber 401 comes into the oil chamber 901 along the arrow D2. In the path along the arrow D2, oil coming in through the port 904 passes the oil path R16, and passes the orifice at the lower end of the oil path R16. The oil passing the orifice comes into the oil chamber 901 through the oil paths R15 and R14.

Now, the expansion operation of the shock absorber 2A will be described. Referring to FIG. 2, the wheel 12 and the rear arm 11 move downward relative to the vehicle while the motorcycle 1 travels. The relative distance between the second member 3 and the first member 4 increases according to the movement and the piston 32 moves in the cylinder 41 in the direction of the arrow X2.

As the piston 32 moves in the direction of the arrow X2, the piston rod 31 withdraws from the cylinder 41. In this way, the capacity in the oil chamber 401 increases. The oil comes into the oil chamber 401 through the port 45 by the amount corresponding to the increase in the volume caused by the withdrawal of the piston rod 31. The oil in the oil chamber 901 in the accumulator 9A comes into the oil chamber 401 through the oil hose 201.

Referring to FIG. 3, the oil in the oil chamber 901 comes into the oil path R14 through the oil path R13. The oil coming into the oil path R14 is discharged to the oil path R12 as indicated by the arrow D3 through a check valve including the port 9132 and the valve member 915. The oil discharged to the oil path R12 comes into the oil chamber 401 through the port 904 and the oil hose 201.

The cushion device 13 according to the present preferred embodiment can apply resistance to oil discharged to the accumulator 9A according to the displacement of the second member 3 during the compression operation of the shock absorber 2A. The displacement of the second member 3 is converted into oil pressure in the oil chamber 402. The oil pressure in the oil chamber 402 is converted into the displacement of the slide member 912 and the slide member 912 controls the valve including the plate spring 914. More specifically, the valve is controlled by the oil pressure in the oil chamber 402. In this way, a damping force in a wide range can be provided to the shock absorber 2A.

Second Preferred Embodiment

Figure 6:
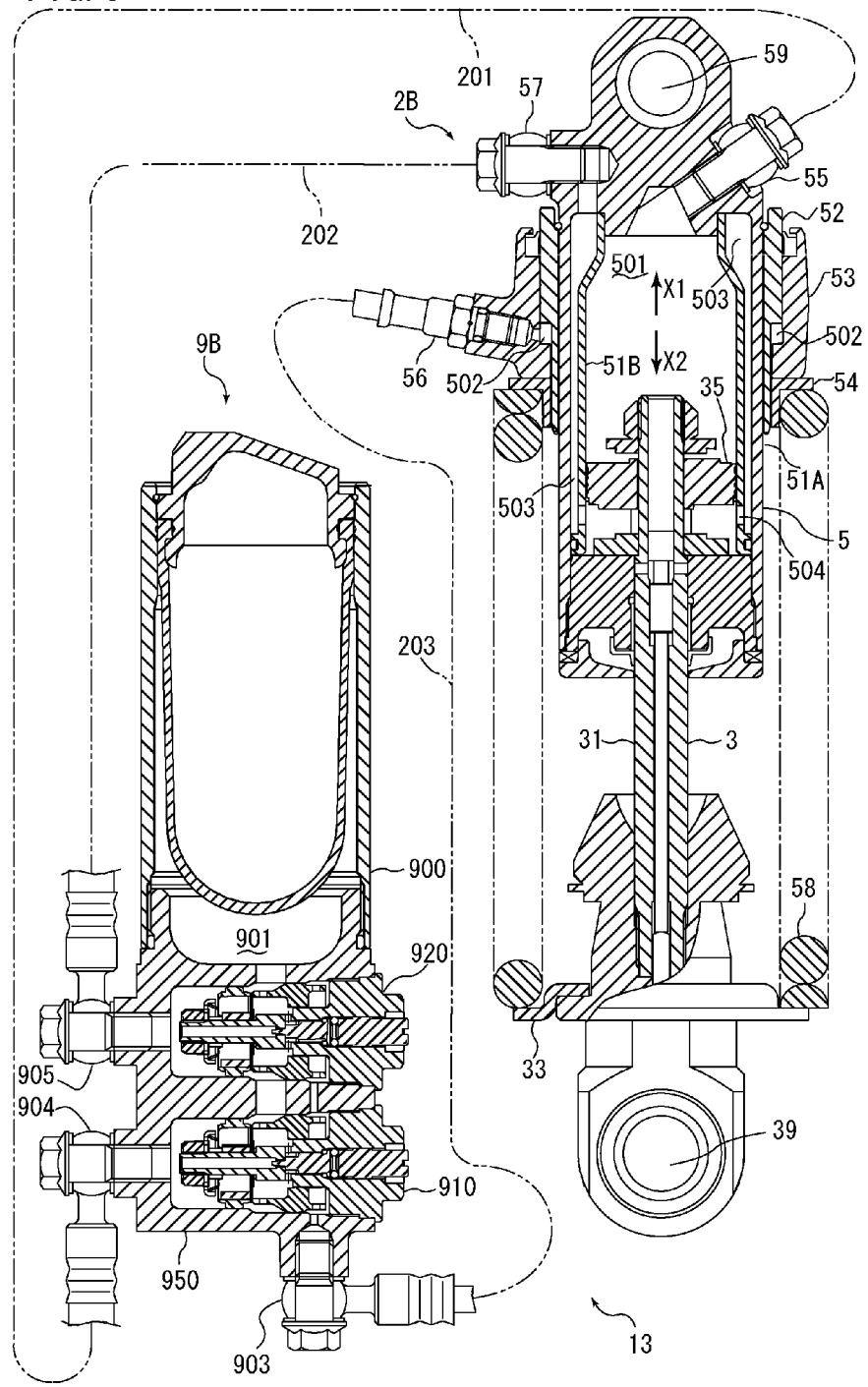
FIG. 6 is a sectional view of a cushion device according to a second preferred embodiment of the present invention.

FIG. 6 is a sectional view of a cushion device 13 according to a second preferred embodiment of the present invention.

The cushion device 13 according to the second preferred embodiment includes a shock absorber 2B and an accumulator 9B.

The shock absorber 2B includes a first member 5 including cylinders 51A and 51B and a second member 3 including a piston 35. The shock absorber 2B is compressed/expanded as the relative position between the first member 5 and the second member 3 changes.

The structure of the second member 3 is preferably the same or substantially the same as that of the first preferred embodiment except that the piston 35 according to the second preferred embodiment does not have a port.

The first member 5 has a double structure including the cylinder 51A and the cylinder 51B provided therein. An oil chamber 501 is provided in the cylinder 51B of the first member 5. The piston 35 of the second member 3 is inserted in the cylinder 51B. An oil chamber 503 is provided at the outer circumference of the cylinder 51B and the inner circumference of the cylinder 51A. The oil chambers 501 and 503 are communicated through an oil path 504.

An annular support member 52 is attached at the outer circumference of the cylinder 51A. An annular slide member 53 is attached at the outer circumference of the support member 52. The slide member 53 is attached to the support member 52 slidably in the axial direction (the direction of the arrow X1 or X2) of the cylinder 51A.

A spring support member 54 is attached to one end of the slide member 53. A spring 58 is attached between the spring support member 54 and a spring support member 33.

A port 55 is communicated with the oil chamber 501 and a port 57 is communicated with the oil chamber 503. An oil hose 201 is connected to the port 55. An oil hose 202 is connected to the port 57. The oil in the oil chamber 501 is discharged into the accumulator 9B or the oil in the accumulator 9B flows in the oil chamber 501 through the oil hose 201. The oil in the oil chamber 503 is discharged into the accumulator 9B or the oil in the accumulator 9B flows in the oil chamber 503 through the oil hose 202. A coupling portion 59 is provided to one end of the first member 5. The coupling portion 59 is attached to a frame in the motorcycle 1 that is not shown. The first member 5 is attached to the coupling portion 59 rotatably in the vertical direction.

A ring-shaped oil chamber 502 is provided between the support member 52 and the slide member 53. The oil chamber 502 is communicated with a port 56. The port 56 is connected with the oil hose 203. The oil in the oil chamber 502 is discharged into the accumulator 9B or the oil in the accumulator 9B flows in the oil chamber 502 through the oil hose 203.

The accumulator 9B includes a tank 900. An oil chamber 901 is provided in the tank 900. A casing 950 is attached to one end of the tank 900. The casing 950 includes regulation units 910 and 920. The regulation unit 910 serves to apply resistance to the oil coming in from the shock absorber 2B during the compression operation of the shock absorber 2B and is the same as that in the first preferred embodiment. The regulation unit 920 serves to apply resistance to oil coming in from the shock absorber 2B during the expansion operation of the shock absorber 2B.

The regulation unit 910 is coupled with the ports 903 and 904. The regulation unit 920 is coupled with a port 905. The port 903 is connected with the oil hose 203. The port 904 is connected with the oil hose 201. The port 905 is connected with the oil hose 202. The oil in the oil chamber 501 is discharged into the oil chamber 901 or the oil in the oil chamber 901 flows in the oil chamber 501 through the oil hose 201 and the regulation unit 910. The oil in the oil chamber 503 is discharged into the oil chamber 901 or the oil in the oil chamber 901 flows in the oil chamber 503 through the oil hose 202 and the regulation unit 920. The oil in the oil chamber 502 enters the regulation units 910 and 920 through the oil hose 203.

Figure 7:
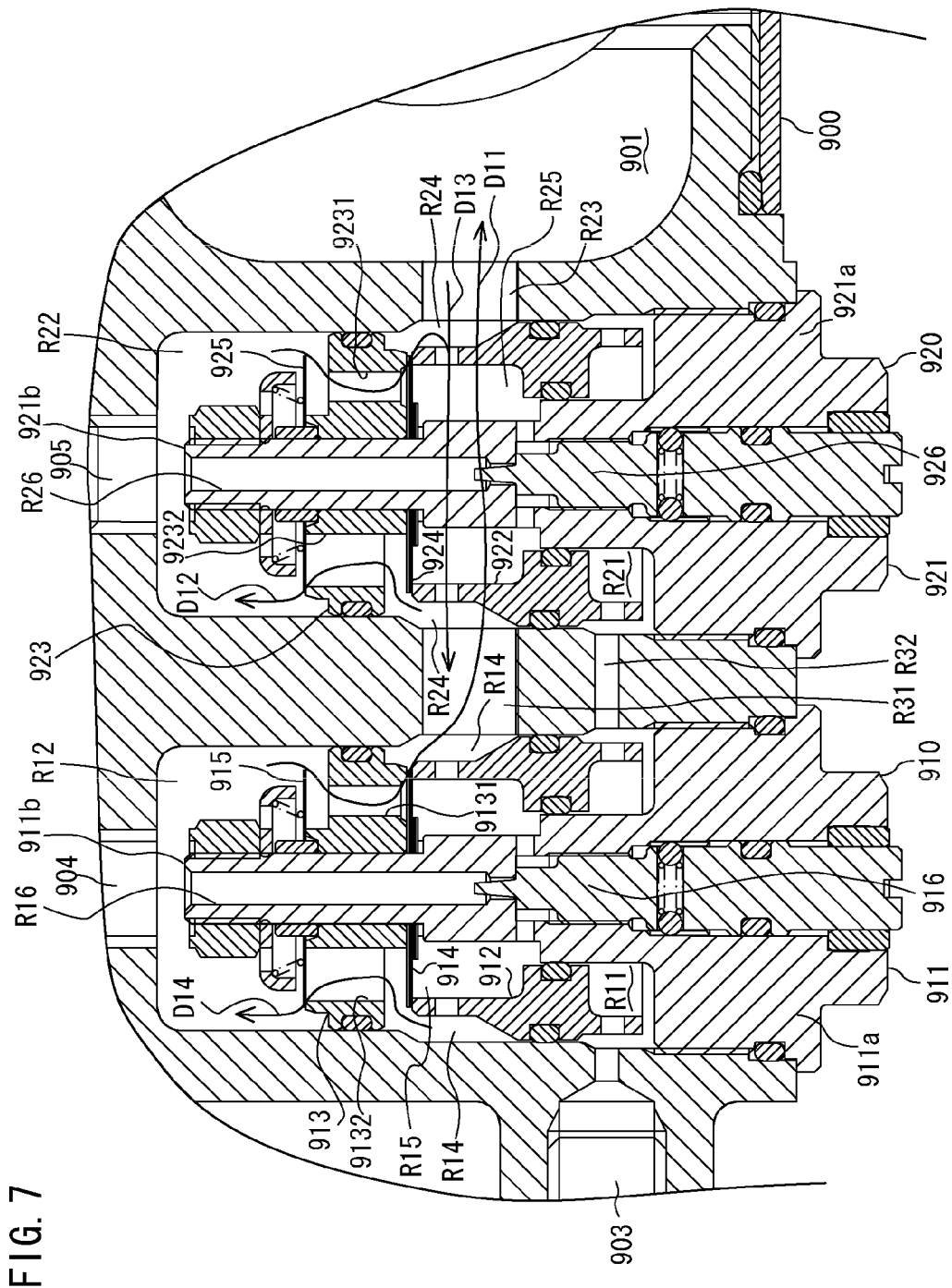
FIG. 7 is a sectional view of a regulation unit.

FIG. 7 is a sectional view of the regulation units 910 and 920. The regulation units 910 and 920 have their up-down direction changed depending on the arrangement of the accumulator 9B and therefore do not have any fixed up-down direction. In the following description, the vertical direction in FIG. 7 will be referred to as the "up-down" direction of the regulation units 910 and 920 for ease of illustration.

The regulation unit 910 preferably has the same or substantially the same structure as that in the first preferred embodiment and therefore its description will not be repeated. The regulation unit 920 preferably has the same or substantially the same structure as that of the regulation unit 910 and therefore the same part will be described only briefly. The unit main body 921 of the regulation unit 920 includes a support portion 921a and an extension portion 921b.

A needle 926 is inserted in the shaft center of the support portion 921a. An oil path R26 is provided in the shaft center of the extension portion 921b. The upper end of the needle 926 is inserted to the lower end of the oil path R26, and an orifice is thus provided.

An annular slide member 922 is fitted to the outer circumference of the extension portion 921b. An oil path R21 is provided between the support member 921a and the slide member 922. The oil path R21 is communicated with the oil path R11 of the regulation unit 910 through the oil path R32. Therefore, the oil path R21 is communicated with the oil chamber 502 through oil paths R32 and R11 and the oil hose 203.

A valve main body 923 is attached to the outer circumference of the extension portion 921b above the slide member 922. The structure of the valve main body 923 is preferably the same as that of the valve main body 913 shown in FIGS. 4A, 4B and 4C. The valve main body 923 includes ports 9231 and 9232.

An oil path R22 is provided above the valve main body 923. An annular plate spring 924 is attached on the lower side of the valve main body 923. An oil path R25 is provided in a region surrounded by the outer circumferential surface of the extension portion 921b, the inner circumferential surface of the slide member 922, and the lower surface of the plate spring 924. An oil path R24 is provided at the outer circumference of the slide member 922. The oil paths R24 and R25 are communicated through a port provided at the slide member 922. The port 9231, the slide member 922, and the plate spring 924 constitute a valve that applies resistance to the flow of oil discharged from the port 9231 to the oil path R24.

The upper end of the slide member 922 is in contact with the lower portion of the plate spring 924. As the oil pressure in the oil path R21 changes, the slide member 922 moves up and down or the contact pressure upon the plate spring 924 changes. The up and down movement of the slide member 922 or the change in the contact pressure changes the upward pressure upon the plate spring 924. In this way, resistance is applied to oil discharged from the port 9231 to the oil path R24. The resistance serves as a damping force during the expansion of the shock absorber 2B as will be described.

An annular valve member 925 is attached on the upper side of the valve main body 923. The port 9232 and the valve member 925 constitute a check valve used to control the flow of oil toward the oil path R22 from the port 9232.

The operation of the cushion device 13 having the above-described structure will be described. The operation of the cushion device 13 during the compression operation of the shock absorber 2B will be described. The operation of the regulation unit 910 during the compression operation of the shock absorber 2B is preferably the same as that according to the first preferred embodiment.

The oil incoming from the port 904 is discharged into the oil path R14 through a valve including the port 9131, the slide member 912, and the plate spring 914. The oil coming into the oil path R14 enters the oil path R24 of the regulation unit 920 through the oil path R31. The oil coming into the oil path R24 further enters the oil chamber 901 through the oil path R23. The flow of oil is indicated by the arrow D11 in FIG. 7. In this way, during the compression operation of the shock absorber 2B, a damping force is generated by the valve including the port 9131, the slide member 912, and the plate spring 914.

The oil coming into the oil path R24 is discharged to the oil path R22 through a check valve including a port R9232 and the valve member 925. The flow of oil is indicated by the arrow D12 shown in FIG. 7. The oil discharged to the oil path R22 enters the oil chamber 503 through the port 905 and the oil hose 202.

The operation of the cushion device 13 during the expansion of the shock absorber 2B will be described. Referring to FIG. 6, when the motorcycle 1 travels, the rear wheel 12 and the rear arm 11 move downward relative to the vehicle. In response to the movement, the relative distance between the second member 3 and the first member 5 increases, and the piston 35 moves in the cylinder 51B in the direction of the arrow X2 in FIG. 6.

As the piston 35 moves in the direction of the arrow X2, the oil in the oil chamber 501 passes the orifice at the inner circumferential surface of the piston rod 31 and escapes to the front side of the piston 35 (in the direction of the arrow X1).

As the piston 35 moves in the direction of the arrow X2, the piston rod 31 withdraws from the cylinder 51B. In this way, the capacity in the oil chamber 501 increases. The oil flows in the oil chamber 501 through the port 55 by the amount corresponding to the increase in the capacity caused by the withdrawal of the piston rod 31. As the piston 35 moves in the direction of the arrow X2, the oil in the oil chamber 503 is discharged to the regulation unit 920 through the port 57 and the oil hose 202.

Referring to FIG. 7, the oil discharged from the oil chamber 901 flows in the oil paths R23, R24, R31, and R14. The flow of oil is indicated by the arrow D13. The oil discharged into the oil path R14 flows in the oil path R12 through a valve including the port 9132 and the valve member 915. The oil discharged into the oil path R12 flows in the oil chamber 501 through the port 904 and the oil hose 201.

The oil discharged from the oil chamber 503 flows in the oil path R22 through the port 57, the oil hose 202, and the port 905. The oil discharged into the oil path R22 flows in the oil path R24 through the valve including the port 9231, the slide member 922, and the plate spring 924. The oil discharged into the oil path R24 flows in the direction of the arrow D13 and flows in the oil path R12 through the valve including the port 9132 and the valve member 915. The oil discharged into the oil path R12 flows in the oil chamber 501 through the oil hose 201.

While the description is related to the expansion of the shock absorber 2B, the valve including the port 9231, the slide member 922, and the plate spring 924 applies resistance to the flow of oil coming in from the oil chamber 503 when the spring 58 is in a compressed state. Therefore, the flow of oil flowing into the oil chamber 501 is provided with resistance.

During the expansion of the shock absorber 2B, if the spring 58 is in a compressed state, the slide member 922 moves upward in FIG. 7 or the contact pressure upon the plate spring 924 is raised, so that the upward pressure on the plate spring 924 increases. In this way, the oil discharged from the port 9231 to the oil path R24 is provided with resistance by the valve including the plate spring 924.

The pressure that pushes the plate spring 924 in the upward direction applies resistance to the oil discharged into the oil path R24 from the port 9231. The pressure is generated based on the upward displacement of the slide member 922. The slide member 922 is displaced in the up-down direction or changes the contact pressure on the plate spring 924 based on the pressure of oil in the oil chamber R21. The pressure of oil in the oil chamber R21 changes based on the pressure of oil in the oil chamber 502 shown in FIG. 6. The pressure of oil in the oil chamber 502 changes based on the displacement of the second member 3 including the piston 35. More specifically, the resistance applied to the oil discharged into the oil path R24 from the port 9231 changes based on the pressure of oil in the oil chamber 502.

The cushion device 13 according to the present preferred embodiment can apply resistance to oil discharged into the accumulator 9B from the shock absorber 2B according to the displacement of the second member 3 during the expansion of the shock absorber 2B besides the compression of the shock absorber 2B. The displacement of the second member 3 is converted into oil pressure in the oil chamber 502 and the valve is controlled by the oil pressure. In this way, the shock absorber 2B can be provided with a damping force in a wide range.

Third Preferred Embodiment

Figure 8:
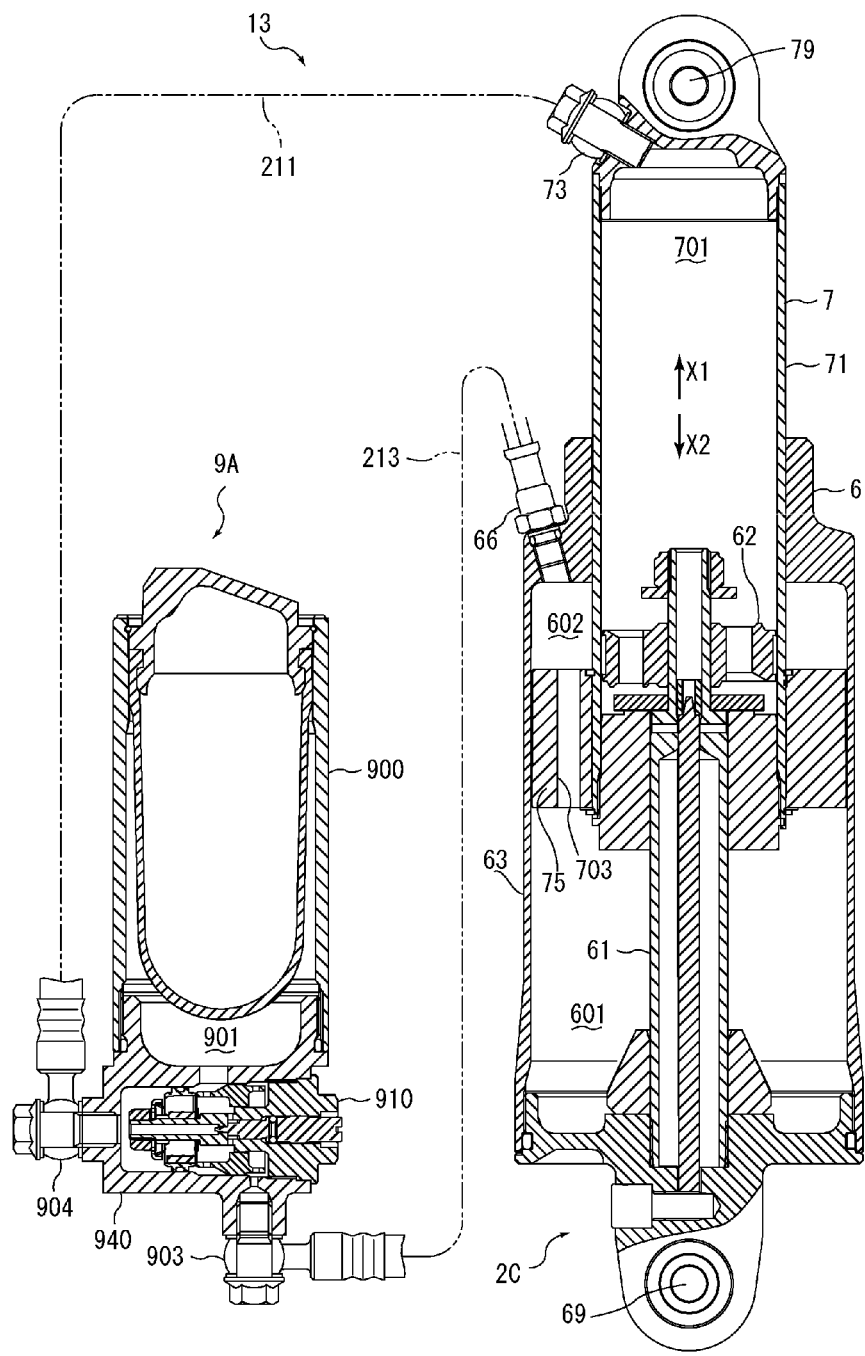
FIG. 8 is a sectional view of a cushion device according to a third preferred embodiment of the present invention.

FIG. 8 is a sectional view of a cushion device 13 according to a third preferred embodiment of the present invention. The cushion device 13 according to the third preferred embodiment includes a shock absorber 2C and an accumulator 9A.

The shock absorber 2C includes a first member 7 including a cylinder 71 and a second member 6 including a piston 62. The shock absorber 2C is expanded/compressed as the relative position between the first member 7 and the second member 6 changes.

An oil chamber 701 is provided in the cylinder 71 of the first member 7. The piston 62 of the second member 6 is inserted in the cylinder 71.

The second member 6 includes a piston rod 61 and the piston 62 attached to the tip end of the piston rod 61. The second member 6 includes a coupling portion 69 at its end. The coupling portion 69 is attached to a frame in the motorcycle 1 that is not shown. The second member 6 is attached rotatably in the up-down direction at the coupling portion 69.

A casing 63 for the second member 6 is arranged to cover the first member 7 at the outer circumference of the cylinder 71 of the first member 7. The casing 63 has an annular shape. A valve member 75 is attached at the outer circumference of the cylinder 71. The valve member 75 has an annular shape. An orifice is provided between the outer circumferential surface of the valve member 75 and the inner circumferential surface of the casing 63. The valve member 75 includes a port 703.

The space outside the cylinder 71 and inside the casing 63 is partitioned into air chambers 601 and 602 by the valve member 75. The air chambers 601 and 602 are communicated by the port 703.

When the piston 62 moves in the oil chamber 701 in the direction of the arrow X1, and the relative distance between the first and second members 7 and 6 is reduced, the capacity of the space having the air chambers 601 and 602 is reduced, so that resistance is applied on the compression operation of the shock absorber 2C.

A port 73 is coupled to the oil chamber 701. The port 73 is connected with an oil hose 211. The oil in the oil chamber 701 is discharged into the accumulator 9A or the oil in the accumulator 9A flows in the oil chamber 701 through the port 73 and the oil hose 211. The first member 7 includes a coupling portion 79 at its end. The coupling portion 79 is coupled to the rear arm 11 through a link mechanism that is not shown. Alternatively, the coupling portion 79 is directly coupled to the rear arm 11.

The air chamber 602 is coupled with a port 66. The port 66 is connected with an air hose 213. The air in the air chamber 602 is discharged into the accumulator 9A or the air in the accumulator 9A flows in the air chamber 602 through the port 66 and the air hose 213.

The structure of the accumulator 9A is the same as that in the first preferred embodiment except that the slide member 912 of the regulation unit 910 is displaced by air pressure. In FIG. 3, the space R11 is used as an oil path in the first preferred embodiment, but the space R11 is used as an air path R11 in the third preferred embodiment.

The port 903 is connected with the air hose 213. The air in the air chamber 602 flows in the regulation unit 910 through the air hose 213 and the port 903.

The operation of the cushion device 13 having the above-described structure will be described. To start with, the compression operation of the shock absorber 2A will be described. Referring to FIG. 8, while the motorcycle 1 travels, the wheel 12 and the rear arm 11 move upward relative to the vehicle. The relative distance between the second member 6 and the first member 7 is reduced in response to the movement, and the piston 62 moves in the cylinder 71 in the direction of the arrow X1.

As the piston 62 moves in the direction of the arrow X1, the oil in the oil chamber 701 passes the orifice at the inner circumferential surface of the piston rod 61 and escapes to the back side of the piston 62 (in the direction of the arrow X2). As the piston 62 moves in the direction of the arrow X1, the oil in the oil chamber 701 passes through the port provided at the piston 62 and escapes to the back side of the piston 62.

As the piston 62 moves in the direction of the arrow X1, the piston rod 61 enters the cylinder 71. In this way, the capacity inside the oil chamber 701 is reduced. The oil in the oil chamber 701 is discharged from the port 73 by the amount corresponding to the reduction in the capacity caused by the entering of the piston rod 61. The oil discharged from the port 73 flows in the regulation unit 910 from the port 904 through the oil hose 211.

As the relative distance between the second member 6 and the first member 7 is reduced, the capacity of the air chamber including the air chambers 601 and 602 is reduced. As the capacity of the air chamber is reduced, the air in the air chamber 602 is discharged from the port 66. The air discharged from the port 66 flows in the regulation unit 910 from the port 903 through the air hose 213.

The operation in the regulation unit 910 is preferably the same as that in the first preferred embodiment except that the air comes in through the port 903 instead of oil. The air discharged from the air chamber 602 comes into the air path R11 shown in FIG. 3. As the air pressure in the air path R11 increases, the slide member 912 moves upward or the contact pressure on the plate spring 914 is raised, so that pressure is applied on the plate spring 914. In this way, resistance is applied to the flow of the oil passed to the oil path R14 from the port 9131. Therefore, during the compression operation of the shock absorber 2C, a damping force according to the displacement of the second member 6 is generated.

Now, the expansion operation of the shock absorber 2C will be described. Referring to FIG. 8, when the motorcycle 1 travels, the wheel 12 and the rear arm 11 move downward relative to the vehicle. In response to the movement, the relative distance between the second member 6 and the first member 7 increases and the piston 62 moves in the cylinder 71 in the direction of the arrow X2 in FIG. 8.

As the piston 62 moves in the direction of the arrow X2, the piston rod 61 withdraws from the cylinder 71. In this way, the capacity inside the oil chamber 701 increases. The oil flows in the oil chamber 701 through the port 73 by the amount corresponding to the increase in the volume caused by the withdrawal of the piston rod 61. The oil in the oil chamber 901 in the accumulator 9A comes into the oil chamber 701 through the oil hose 211.

The operation in the regulation unit 910 is preferably the same as that in the first preferred embodiment except that the air comes in through the port 903 instead of oil. In FIG. 3, the oil in the oil chamber 901 flows in the direction of the arrows D3 and D4 and comes into the oil path R12. The oil discharged into the oil path R12 flows in the oil chamber 701 through the port 904 and the oil hose 211.

The cushion device 13 according to the present preferred embodiment can apply resistance to oil discharged into the accumulator 9A according to the displacement of the second member 3 during the compression operation of the shock absorber 2C. The displacement of the second member 3 is converted into air pressure in the air chamber 602 and the valve is controlled by the air pressure. In this way, a damping force in a wide range can be applied to the shock absorber 2C.

Fourth Preferred Embodiment

Figure 9:
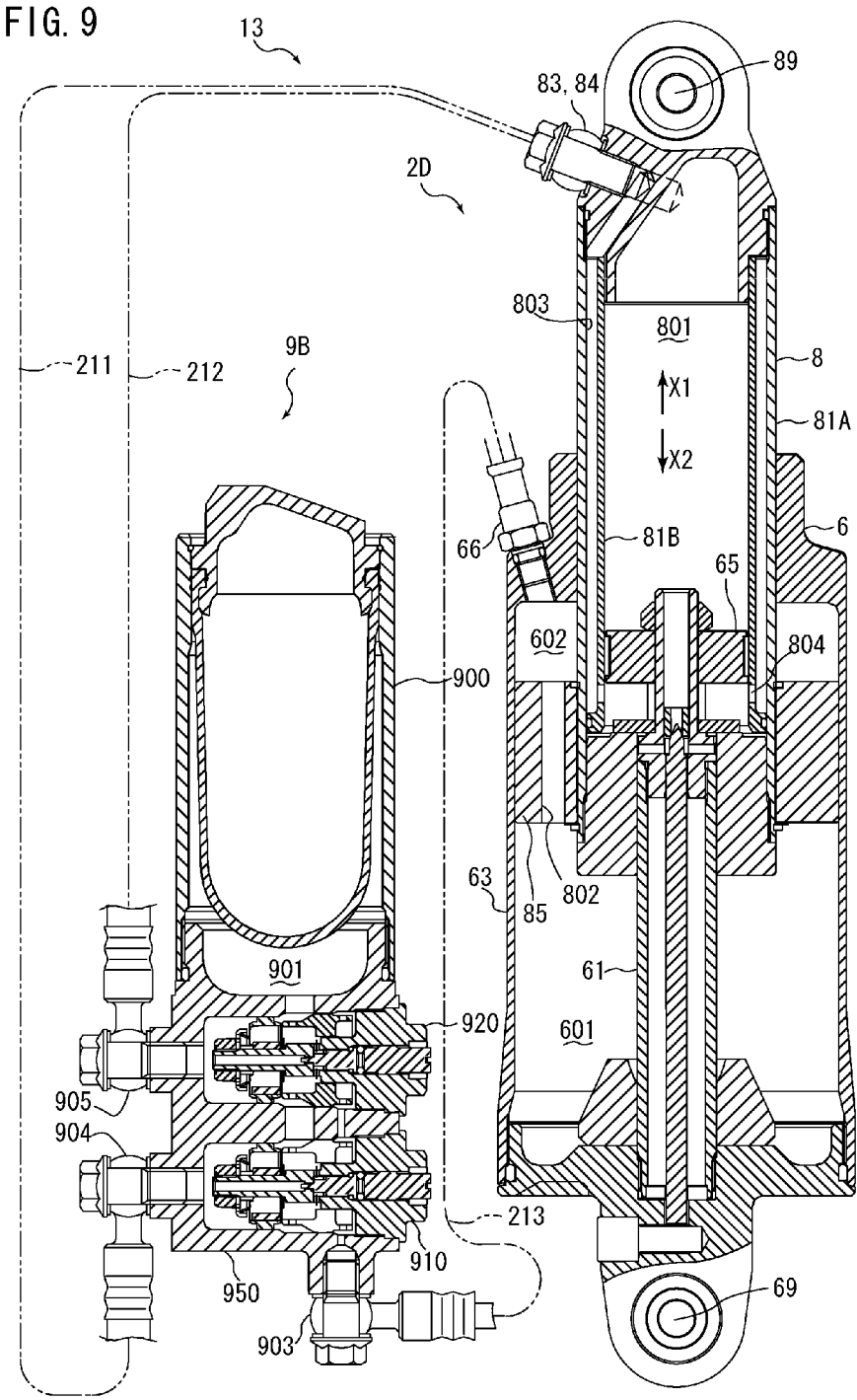
FIG. 9 is a sectional view of a cushion device according to a fourth preferred embodiment of the present invention.

FIG. 9 is a sectional view of the cushion device 13 according to a fourth preferred embodiment of the present invention. The cushion device 13 according to the fourth preferred embodiment includes a shock absorber 2D and an accumulator 9B.

The shock absorber 2D includes a first member 8 including cylinders 81A and 81B and a second member 6 including a piston 65. The shock absorber 2D is expanded/compressed as the relative position between the first member 8 and the second member 6 changes.

An oil chamber 801 is provided in the cylinder 81B of the first member 8. The piston 65 of the second member 6 is inserted in the cylinder 81B.

An oil chamber 803 is provided at the outer circumference of the cylinder 81B and at the inner circumference of the cylinder 81A. The oil chambers 801 and 803 are communicated through an oil path 804.

A casing 63 for the second member 6 is provided at the outer circumference of the cylinder 81A of the first member 8 to cover the first member 8. The casing 63 has an annular shape. A valve member 85 is attached at the outer circumference of the cylinder 81A. The valve member 85 has an annular shape. An orifice is provided between the outer circumferential surface of the valve member 85 and the inner circumferential surface of the casing 63. The valve member 85 includes a port 802.

The space outside the cylinder 81A and inside the casing 63 is partitioned by the valve member 85 into air chambers 601 and 602. The air chambers 601 and 602 are communicated by the port 802.

When the piston 65 moves in the direction of the arrow X1 and the relative distance between the first member 8 and the second member 6 is reduced, the capacity of the space including the air chambers 601 and 602 is reduced, so that resistance is applied on the compression operation of the shock absorber 2D.

The oil chamber 801 is coupled with the port 83. The port 83 is connected with the oil hose 211. The oil in the oil chamber 801 is discharged into the accumulator 9B or the oil in the accumulator 9B flows in the oil chamber 801 through the port 83 and the oil hose 211. The oil chamber 803 is coupled with a port 84. The port 84 is connected with the oil hose 212. The oil in the oil chamber 803 is discharged into the accumulator 9B or the oil in the accumulator 9B flows in the oil chamber 803 through the port 84 and the oil hose 212. A coupling portion 89 is provided at the end of the first member 8. The coupling portion 89 is coupled with the rear arm 11 through a link mechanism that is not shown. Alternatively, the coupling portion 89 is directly coupled to the rear arm 11.

The structure of the accumulator 9B is preferably the same as that in the second preferred embodiment except that the slide member 912 of a regulation unit 910 and the slide member 922 of a regulation unit 920 are displaced by air pressure. In FIG. 7, the spaces R11 and R21 are used as oil paths in the second preferred embodiment, but in the fourth preferred embodiment, the space R11 is used as an air path R11 and the space R21 is used as an air path R21.

The port 903 is connected with the air hose 213. The air in the air chamber 602 is discharged into the regulation units 910 and 920 through the air hose 213 and the port 903.

The operation of the cushion device 13 having the above-described structure will be described. To start with, the compression operation of the shock absorber 2D will be described. Referring to FIG. 9, when the motorcycle 1 travels, the wheel 12 and the rear arm 11 move upward relative to the vehicle. The relative distance between the second member 6 and the first member 8 is reduced in response to the movement, and the piston 65 moves in the cylinder 81B in the direction of the arrow X1 in FIG. 9.

As the piston 65 moves in the direction of the arrow X1, the oil in the oil chamber 801 passes the orifice at the inner circumferential surface of the piston rod 61 and escapes to the back side of the piston 65 (in the direction of the arrow X2).

As the piston 65 moves in the direction of the arrow X1, the piston rod 61 enters the cylinder 81B. In this way, the capacity in the oil chamber 801 is reduced. The oil in the oil chamber 801 is discharged from the port 83 by the amount corresponding to the reduction in the capacity caused by the entering of the piston rod 61. The oil discharged from the port 83 flows in the regulation unit 910 through the oil hose 211 and the port 904.

As the relative distance between the second member 6 and the first member 8 is reduced, the capacity of the air chamber including the air chambers 601 and 602 is reduced, so that the air in the air chamber 602 is discharged from the port 66. The air discharged from the port 66 flows in the regulation unit 910 from the port 903 through the air hose 213.

The operation in the regulation unit 910 is preferably the same as that in the first preferred embodiment except that the air comes in through the port 903 instead of oil. The air discharged from the air chamber 602 comes into the air path R11 shown in FIG. 3. As the air pressure in the air path R11 increases, the slide member 912 moves upward, or the contact pressure upon the plate spring 914 is raised, so that pressure is applied on the plate spring 914. In this way, resistance is applied to the flow of oil from the port 9131 into the oil path R14. Therefore, during the compression operation of the shock absorber 2D, a damping force is generated according to the displacement of the second member 6.

The operation in the regulation unit 920 is preferably the same as that in the second preferred embodiment except that the air comes in through the port 903 instead of oil. The oil discharged into the oil path R14 from the port 9131 flows in the oil path R22 through the oil paths R31 and R24 and the port 9232. The oil discharged into the oil path R22 from the port 9232 passes a check valve including the valve member 925. The oil discharged into the oil path R22 flows in the oil chamber 803 through the port 905 and the oil hose 212.

Now, the expansion operation of the shock absorber 2D will be described. Referring to FIG. 9, when the motorcycle 1 travels, the wheel 12 and the rear arm 11 move downward relative to the vehicle. The relative distance between the second member 6 and the first member 8 is increased in response to the movement, and the piston 65 moves in the cylinder 81B in the direction of the arrow X2 in FIG. 9.

As the piston 65 moves in the direction of the arrow X2, the piston rod 61 withdraws from the cylinder 81B. This increases the capacity in the oil chamber 801. The oil comes into the oil chamber 801 through the port 83 by the amount corresponding to the increase in the volume caused by the withdrawal of the piston rod 61. The oil in the oil chamber 901 in the accumulator 9B comes into the oil chamber 801 through the oil hose 211.

As the piston 65 moves in the direction of the arrow X2, the oil in the oil chamber 801 comes into the oil chamber 803. The oil discharged into the oil chamber 803 is discharged into the regulation unit 920 through the port 84 and the oil hose 212.

The operation in the regulation unit 920 is preferably the same as that in the second preferred embodiment except that the air comes in through the port 903 instead of oil. As shown in FIG. 7, the oil discharged into the regulation unit 920 from the oil chamber 803 flows in the oil path R22. The oil discharged into the oil path R22 flows in the oil path R24 through a valve including the port 9231, the slide member 922, and the plate spring 924.

The air coming in from the port 903 flows in the air path R21 through the air paths R11 and R32. The position of the slide member 922 in the up-down direction is controlled by the air coming into the air path R21. The oil discharged into the oil path R24 from the port 9231 is provided with resistance by the valve including the port 9231, the slide member 922, and the plate spring 924. More specifically, during the expansion of the shock absorber 2D, a damping force according to the displacement of the second member 6 is applied. The oil discharged into the oil path R24 flows in the directions of the arrows D13 and D14 in FIG. 7 and returns to the oil chamber 801 of the first member 8.

The cushion device 13 according to the present preferred embodiment can apply resistance to oil discharged to the accumulator 9B according to the displacement of the second member 3 during the compression and expansion operation of the shock absorber 2D. The displacement of the second member 3 is converted into oil pressure in the air chamber 602, and the valve is controlled by the oil pressure. In this way, a damping force in a wide range can be applied to the shock absorber 2D.

Fifth Preferred Embodiment

Figure 10:
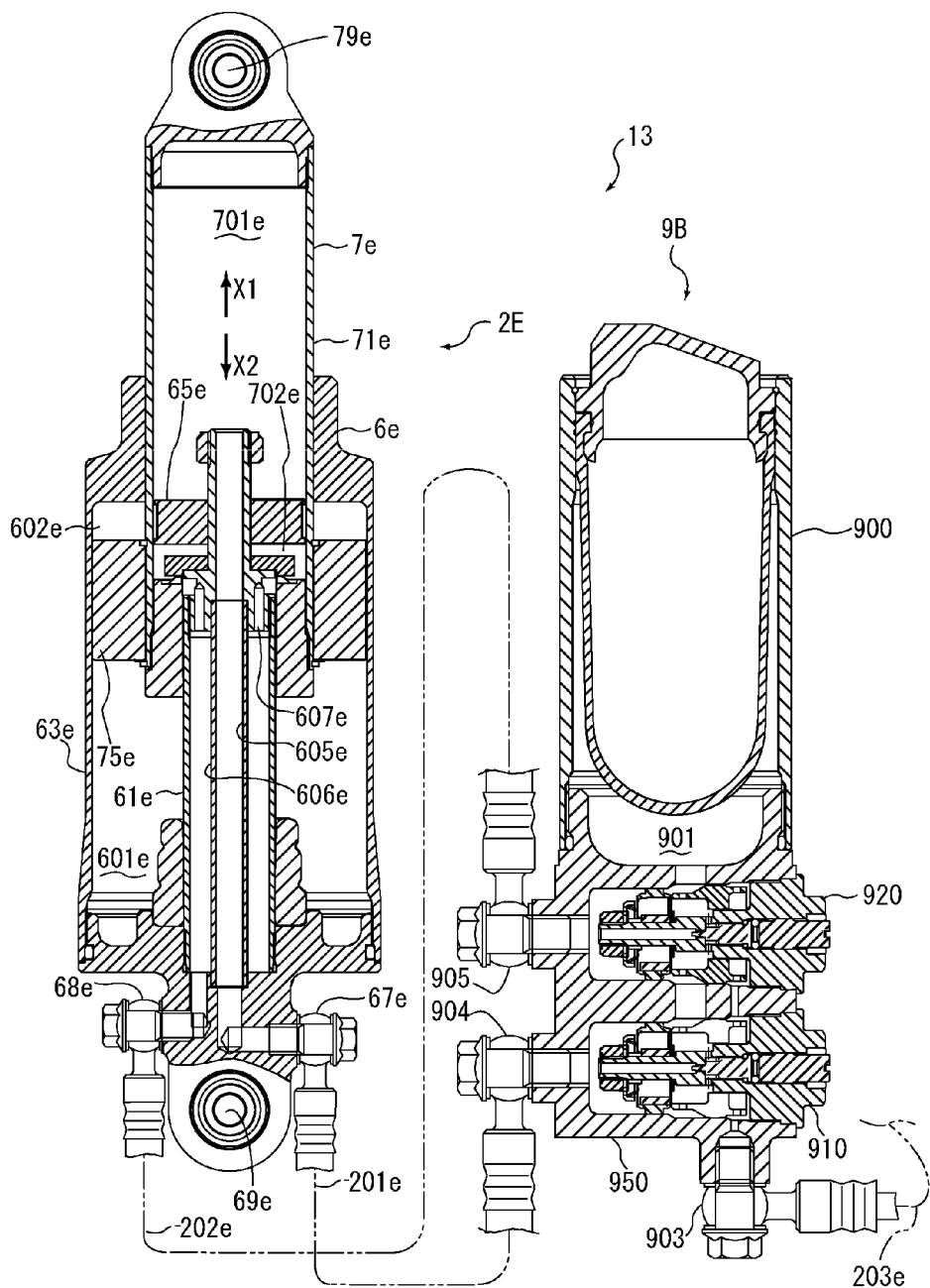
FIGS. 10 and 11 are sectional views of a cushion device according to a fifth preferred embodiment of the present invention.
Figure 11:
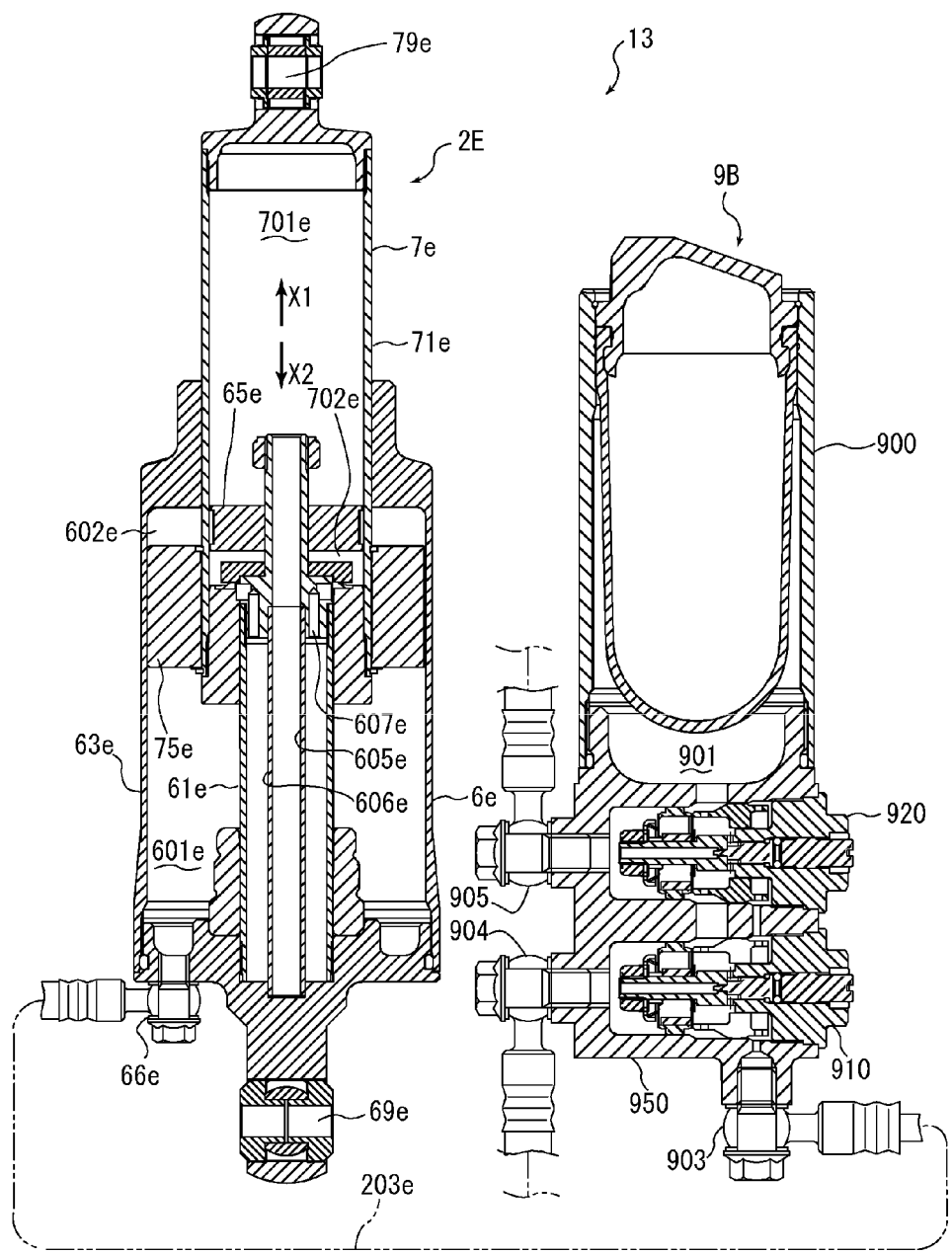

FIGS. 10 and 11 are sectional views of a cushion device 13 according to a fifth preferred embodiment of the present invention. The cushion device 13 according to the fifth preferred embodiment includes a shock absorber 2E and an accumulator 9B. FIGS. 10 and 11 are sectional views of the shock absorber 2E seen from different angles.

Referring to FIG. 10, the shock absorber 2E includes a first member 7e including a cylinder 71e and a second member 6e including a piston 65e. The shock absorber 2E is compressed/expanded as the relative distance between the first and second members 7e and 6e changes.

An oil chamber 701e is provided in the cylinder 71e of the first member 7e. The piston 65e of the second member 6e is inserted in the cylinder 71e.

The second member 6e includes a piston rod 61e and the piston 65e attached at a tip end of the piston rod 61e. A coupling portion 69e is provided at the other end of the second member 6e. The coupling portion 69e is attached to a frame in the motorcycle 1 that is not shown. The second member 6e is attached rotatably in the vertical direction at the coupling portion 69e.

A casing 63e for the second member 6e is provided to cover the first member 7e at the outer circumference of the cylinder 71e of the first member 7e. The casing 63e has an annular shape. A valve member 75e is attached to the outer circumference of the cylinder 71e. The valve member 75e has an annular shape. The space between the outer circumferential surface of the valve member 75e and the inner circumferential surface of the casing 63e is sealed.

The space outside the cylinder 71e and inside the casing 63e is partitioned into air chambers 601e and 602e by the valve member 75e.

Oil paths 605e and 606e are provided in the piston rod 61e. The oil path 605e has its tip end coupled to the oil chamber 701e. The oil path 606e is coupled to the oil chamber 702e through a port 607e.

When the piston 65e moves in the direction of the arrow X1 in the oil chamber 701e and the relative distance between the first and second members 7e and 6e is reduced, the capacity of the space of the air chamber 601e is reduced, and the space of the air chamber 602e is inflated. In this way, resistance is applied on the compression operation of the shock absorber 2E.

The oil chamber 701e is coupled to a port 67e through the oil path 605e. The oil chamber 702e is coupled to a port 68e through the port 607e and the oil path 606e. The port 67e is connected with an oil hose 201e. The port 68e is connected with an oil hose 202e. The oil in the oil chamber 701e is discharged into the accumulator 9B or the oil in the accumulator 9B flows in the oil chamber 701e through the oil hose 201e. The oil in the oil chamber 702e is discharged into the accumulator 9B or the oil in the accumulator 9B flows in the oil chamber 702e through the oil hose 202e. A coupling portion 79e is provided at an end of the first member 7e. The coupling portion 79e is coupled to a rear arm 11 trough a link mechanism that is not shown. Alternatively, the coupling portion 79e is directly coupled to the rear arm 11.

Referring to FIG. 11, an air chamber 601e is coupled with a port 66e. The port 66e is connected with an air hose 203e. The air in the air chamber 601e is discharged into the accumulator 9B or the air in the accumulator 9B flows in the air chamber 601e through the port 66e and the air hose 203e.

The structure of the accumulator 9B is the same as that in the second preferred embodiment except that the air pressure is used to displace the slide member 912 of the regulation unit 910 and the slide member 922 of the regulation unit 920. In FIG. 7, the spaces R11, R21, and R32 are used as oil paths in the second preferred embodiment, while in the fifth preferred embodiment, the spaces R11, R21, and R32 are used as air paths R11, R21, and R32.

The port 903 of the accumulator 9B is connected with the air hose 203e. The air in the air chamber 601e is discharged into the regulation units 910 and 920 through the air hose 203e and the port 903.

The operation of the cushion device 13 having the above-described structure will be described. To start with, the compression operation of the shock absorber 2E will be described. Referring to FIG. 10, when the motorcycle 1 travels, the wheel 12 and the rear arm 11 move upward relative to the vehicle. In response to the movement, the relative distance between the second and first members 6e and 7e is reduced, and the piston 65e moves in the cylinder 71e in the direction of the arrow X1 in FIG. 10.

As the piston 65e moves in the direction of the arrow X1, the oil in the oil chamber 701e is discharged into the port 605e.

As the piston 65e moves in the direction of the arrow X1, the piston rod 61e enters the cylinder 71e. This reduces the capacity in the oil chamber 701e. The oil in the oil chamber 701e is discharged from the port 605e by the amount corresponding to the reduction in the capacity caused by the entering of the piston rod 61e. The oil discharged from the port 605e flows in the regulation unit 910 through the port 67e, the oil hose 201e, and the port 904.

As the relative distance between the second member 6e and the first member 7e is reduced, the capacity of the air chamber 601e is reduced. The capacity of the air chamber 601e is reduced, so that the air in the air chamber 601e is discharged from the port 66e (FIG. 11). The air discharged from the port 66e flows in the regulation units 910 and 920 from the port 903 through the air hose 203e.

The operation in the regulation unit 910 is preferably the same as that in the second preferred embodiment except that the air comes in through the port 903 instead of oil. The air discharged from the air chamber 601e flows in the air path R11 shown in FIG. 7. As the air pressure in the air path R11 increases, the slide member 912 moves upward or the contact pressure on the plate spring 914 is raised, so that pressure is applied on the plate spring 914. Therefore, resistance is applied on the flow of oil passed to the oil path R14 from the port 9131. In this way, during the compression operation of the shock absorber 2E, a damping force according to the displacement of the second member 6e is generated.

The operation in the regulation unit 920 is preferably the same as that in the second preferred embodiment except that the air comes in through the port 903 instead of oil. The oil discharged from the port 9131 into the oil path R14 comes into the oil path R22 through the oil path R31, the oil path R24 and the port 9232. The oil discharged from the port 9232 to the oil path R22 passes through a check valve including the valve member 925. The oil discharged into the oil path R22 flows in the oil chamber 702e through the port 905 and the oil hose 202e.

Now, the expansion operation of the shock absorber 2E will be described. Referring to FIG. 10, when the motorcycle 1 travels, the wheel 12 and the rear arm 11 move downward relative to the vehicle. The relative distance between the second member 6e and the first member 7e increases in response to the movement, and the piston 65e moves in the cylinder 71e in the direction of the arrow X2 in FIG. 10.

As the piston 65e moves in the direction of the arrow X2, the piston rod 61e withdraws from the cylinder 71e. This increases the capacity in the oil chamber 701e. The oil flows in the oil chamber 701e through the port 67e by the amount corresponding to the increase in the volume caused by the withdrawal of the piston rod 61e. The oil in the oil chamber 901 in the accumulator 9B flows in the oil chamber 701e through the oil hose 201e.

As the piston 65e moves in the direction of the arrow X2, the oil in the oil chamber 702e is discharged into the regulation unit 920 through the ports 607e, 606e, and 68e and the oil hose 202e.

The operation in the regulation unit 920 is preferably the same as that in the second preferred embodiment except that the air comes in through the port 903 instead of the oil. As shown in FIG. 7, the oil discharged into the regulation unit 920 from the oil chamber 702e flows in the oil path R22. The oil coming into the oil path R22 flows in the oil path R24 through the valve including the port 9231, the slide member 922, and the plate spring 924.

The air coming in from the port 903 flows in the air path R21 through the air paths R11 and R32. The position of the slide member 922 in the up-down direction is controlled by the air coming into the air path R21. Resistance is applied to the oil discharged into the oil path R24 from the port 9231 by the valve including the port 9231, the slide member 922, and the plate spring 924. More specifically, during the expansion of the shock absorber 2E, a damping force according to the displacement of the second member 6e is applied. The oil discharged into the oil path R24 flows in the directions of the arrows D13 and D14 in FIG. 7 and returns to the oil chamber 701e of the first member 7e.

The cushion device 13 according to the present preferred embodiment can apply resistance to the oil discharged to the accumulator 9B according to the displacement of the second member 6e during the compression and expansion operation of the shock absorber 2E. The displacement of the second member 6e is converted into air pressure in the air chamber 601e and the air pressure controls the valve. In this way, a damping force in a wide range can be applied to the shock absorber 2E.

According to the fifth preferred embodiment, the ports 67e and 68e for oil and the port 66e for air are all provided at the second member 6e. A hose can be arranged more easily than the arrangement in which a hose is connected to both the first and second members 7e and 6e.

Simulation Results

FIG. 12 shows measurement results of a damping force applied on the shock absorber 2A in the cushion device 13 according to the first preferred embodiment. The abscissa in the graph represents the stroke position of the second member 3. The piston 32 is more advanced in the direction of arrow X1 in the cylinder 401 toward the right in the graph. The ordinate in the graph represents the value of a damping force applied on the second member 3.

The measurement results in FIG. 12 indicate the value of a damping force when the second member 3 moved at four speeds from 0.1 m/s to 1.0 m/s, for example. As can be understood, as the displacement of the piston 32 in the direction of the arrow X1 increases, in other words, as the shock absorber 2A was more compressed, the value of a damping force increases.

FIG. 13 shows measurement results for the value of a damping force under the same conditions using a conventional cushion device. The conventional cushion device controls a valve by converting the displacement of the piston of a shock absorber into the displacement of a cushion member or the like. As shown in FIG. 13, in the conventional cushion device, the value of a damping force increases as the piston carries out a compression operation.

As can be understood from comparison between FIGS. 12 and 13, the damping force value changes more greatly with the compression operation of the piston in the cushion device 13 according to the first preferred embodiment. FIG. 14 shows the difference in damping force between the present preferred embodiment and the conventional cushion device when the piston moves at a speed of 0.6 m/s, for example. In this way, according to the present preferred embodiments, the damping force can be controlled in a wide range according to the displacement of the piston.

In the description of the first to fifth preferred embodiments, the first member including the cylinder is preferably connected to the rear arm 11 and the second member including the piston is preferably connected to the frame of the vehicle by way of illustration. The first member including the cylinder may be connected to the vehicle frame and the second member including the piston may be connected to the rear arm 11.

While preferred embodiments of the present invention have been described above, it is to be understood that variations and modification will be apparent to those skilled in the art without departing the scope and spirit of the present invention. The scope of the present invention, therefore, is to be determined solely by the following claims.

What is claimed is:

1. A cushion device comprising:
    a shock absorber including:
        a first member including a cylinder;
        a second member including a piston, the first and second members being arranged such that a relative position of the second member with respect to the first member is variable;
        a first oil chamber with a capacity that changes depending on the relative position of the second member; and
        a first fluid chamber with a capacity that changes depending on the relative position of the second member;
    an accumulator arranged to accumulate oil discharged from the shock absorber;
    an oil path connected to the first oil chamber; and
    a fluid path connected to the first fluid chamber; wherein
    the accumulator includes:
        a second oil chamber connected to the first oil chamber through the oil path;
        a second fluid chamber connected to the first fluid chamber through the fluid path; and
        a valve controlled by a pressure of fluid supplied to the second fluid chamber through the fluid path and arranged to apply resistance to a flow of oil discharged from the first oil chamber depending on the relative position of the second member; wherein
    the second fluid chamber is arranged to receive fluid from the first fluid chamber during a compression of the shock absorber.

2. The cushion device according to claim 1, wherein the oil path includes a first oil path arranged to supply the second oil chamber with oil in the first oil chamber during the compression of the shock absorber; and
    the valve includes a first valve arranged to apply resistance to oil discharged into the second oil chamber through the first oil path during the compression of the shock absorber.

3. The cushion device according to claim 1, wherein the oil path includes a second oil path arranged to supply the second oil chamber with oil in the first oil chamber during an expansion of the shock absorber; and the valve includes a second valve arranged to apply resistance to oil discharged from the first oil chamber through the second oil path during the expansion of the shock absorber.

4. The cushion device according to claim 2, wherein the oil path includes a second oil path arranged to supply the second oil chamber with oil in the first oil chamber during the expansion of the shock absorber; and the valve includes a second valve arranged to apply resistance to oil discharged from the first oil chamber through the second oil path during the expansion of the shock absorber.

5. The cushion device according to claim 1, wherein the first and second fluid chambers are filled with oil and the valve is controlled by the pressure of the oil.

6. The cushion device according to claim 1, wherein the first and second fluid chambers are filled with air and the valve is controlled by the pressure of the air.

7. The cushion device according to claim 1, wherein the cushion device includes a spring provided between the first and second members, and the capacity of the first fluid chamber is changed by an expansion/compression movement of the spring.

8. The cushion device according to claim 1, wherein the cushion device includes an air chamber provided between the first and second members, and the air chamber includes the first fluid chamber.

9. The cushion device according to claim 7, wherein the first member includes a first port arranged to couple the oil path and the first oil chamber, and a second port arranged to couple the fluid path and the first fluid chamber.

10. The cushion device according to claim 8, wherein the first member includes a first port arranged to couple the oil path and the first oil chamber; and the second member includes a second port arranged to couple the fluid path and the first fluid chamber.

11. The cushion device according to claim 8, wherein the second member includes a first port arranged to couple the oil path and the first oil chamber and a second port arranged to couple the fluid path and the first fluid chamber.

12. A motorcycle comprising the cushion device according to claim 1.

13. A motorcycle comprising the cushion device according to claim 2.

14. A motorcycle comprising the cushion device according to claim 3.

* * * * *